United States Patent
Milliken et al.

(10) Patent No.: US 7,289,524 B2
(45) Date of Patent: Oct. 30, 2007

(54) EXECUTION UNIT FOR A NETWORK PROCESSOR

(75) Inventors: Walter Clark Milliken, Dover, NH (US); Jack Dietz, Cambridge, MA (US)

(73) Assignee: BBN Technologies Corp., Cambridge, MA (US)

(*) Notice: Subject to any disclaimer, the term of this patent is extended or adjusted under 35 U.S.C. 154(b) by 1125 days.

(21) Appl. No.: 10/263,641

(22) Filed: Oct. 3, 2002

(65) Prior Publication Data

US 2003/0091036 A1    May 15, 2003

Related U.S. Application Data

(60) Provisional application No. 60/327,094, filed on Oct. 4, 2001.

(51) Int. Cl.
*H04L 12/02* (2006.01)
(52) U.S. Cl. .................................................. 370/419
(58) Field of Classification Search ............. 370/412, 370/413, 419
See application file for complete search history.

(56) References Cited

U.S. PATENT DOCUMENTS

| | | | |
|---|---|---|---|
| 5,809,078 A | 9/1998 | Tani et al. | |
| 6,054,942 A | 4/2000 | Stemmler | 341/58 |
| 6,076,137 A | 6/2000 | Asnaashari | |
| 6,212,569 B1 | 4/2001 | Cashman et al. | 709/236 |
| 6,327,639 B1 | 12/2001 | Asnaashari | |
| 6,438,678 B1 | 8/2002 | Cashman et al. | 712/34 |
| 6,725,351 B1 | 4/2004 | Shimizu | |

OTHER PUBLICATIONS

Federal Information Processing Standards Publication 197, Nov. 26, 2001, Announcing the Advanced Encryption Standard (AES), 50 pages.
Joan Daemen and Vincent Rijmen, The Rijndael Block Cipher, AES Proposal: Rijndael, Document version 2, Mar. 9, 1999, 45 pages.

*Primary Examiner*—Melvin Marcelo
(74) *Attorney, Agent, or Firm*—Ropes & Gray LLP

(57) ABSTRACT

An execution unit (260) within a network processor (110) performs multiple protocol-processing functions. The execution unit (260) includes a set of specialized registers (310-350) and a memory system (265). The specialized registers (310-350) store data during performance of the protocol-processing functions. The specialized registers (310-350) include one or more input registers, at least one control register, and one or more output registers. The memory system (265) includes multiple memories that operate together to facilitate performance of the protocol-processing functions by the execution unit (260).

29 Claims, 19 Drawing Sheets

EXECUTION UNIT FOR A NETWORK PROCESSOR

RELATED APPLICATION

This application claims priority under 35 U.S.C. § 119 based on U.S. Provisional Application No. 60/327,094, filed Oct. 4, 2001, the disclosure of which is incorporated herein by reference.

BACKGROUND OF THE INVENTION

1. Field of the Invention

The present invention relates generally to network systems and, more particularly, to an execution unit for a network device.

2. Description of Related Art

Network devices, such as switches and routers, connect together to form a network. These devices facilitate communication between parties connected to the network.

During operation, conventional network devices perform a variety of common protocol-processing primitive functions, such as bit-field inserts and extracts, shift operations, bit- and byte-stuffing and unstuffing, time-space interleaving, byte-remapping, and primitive cryptography operations. To implement these functions, the network devices typically include dedicated components for performing each of these functions.

SUMMARY OF THE INVENTION

Systems and methods consistent with the present invention provide a functional processing unit within a larger network processor that implements a wide variety of common protocol-processing primitive functions.

In accordance with the principles of the invention as embodied and broadly described herein, an execution unit within a network processor performs multiple protocol-processing functions. The execution unit includes a set of specialized registers and a memory system. The specialized registers store data during performance of the protocol-processing functions. The specialized registers include one or more input registers, at least one control register, and one or more output registers. The memory system includes multiple memories that operate together to facilitate performance of the protocol-processing functions by the execution unit.

In another aspect of the invention, a network device includes network processors connected to communicate via a switching fabric. The network processors include input register files, output register files, and an execution unit. The execution unit performs protocol-processing functions on data received via the input register files and outputs data via the output register files. The execution unit includes specialized registers and a memory. The specialized registers store the data during performance of the protocol-processing functions. The memory takes different forms depending on which of the protocol-processing functions is performed by the execution unit.

In yet another aspect of the invention, a method for performing bit movement functions by an execution unit within a network processor is provided. The execution unit includes specialized registers and a crossbar element. The method includes loading a first operand into a first one of the registers; loading a second operand into a second one of the registers; providing the first and second operands to the crossbar element; writing an output of the crossbar element to third and fourth ones of the registers; storing contents of the fourth register to the second register; and outputting the contents of the third and fourth registers.

In a further aspect of the invention, a method for performing a table lookup function by an execution unit within a network processor is provided. The execution unit includes specialized registers and a memory system that includes multiple memories. The method includes loading an operand into a first one of the registers; receiving an address of a table stored in one or more of the memories; using the operand to access a value in the table; writing the value from the table into a second one of the registers; and outputting the contents of the second register.

In another aspect of the invention, a method for performing time-space switching by an execution unit within a network processor is provided. The execution unit includes a number of specialized registers and a memory system that includes a number of memories. The method includes writing input data into a first one of the registers; storing a first input control word in a second one of the registers; storing a second input control word in a third one of the registers; and writing the input data into the memories based on the first and second input control words. The method further includes storing a first output control word in the second register; storing a second output control word in the third register; and outputting the input data from the memories based on the first and second output control words.

BRIEF DESCRIPTION OF THE DRAWINGS

The accompanying drawings, which are incorporated in and constitute a part of this specification, illustrate the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Systems and methods consistent with the present invention provide an execution unit within a network device. The execution unit performs a wide variety of protocol-processing primitive operations, such as bit-field inserts and extracts, shift operations, bit and byte stuffing and unstuffing, SONET channel decomposition (e.g., time-space interleaving), byte-remapping (e.g., table lookup), and cryptography operations.

Exemplary System Configuration

Figure 1:
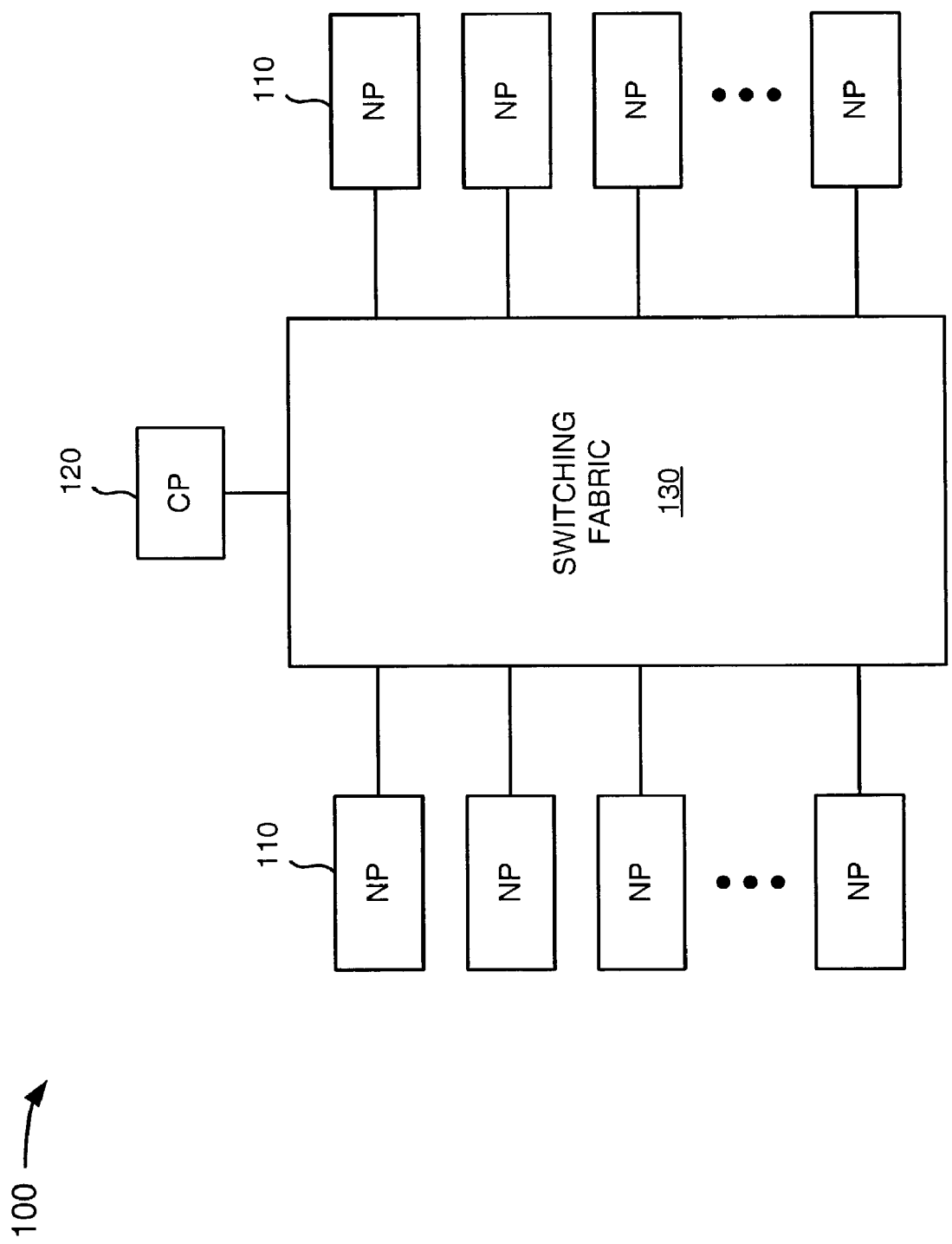
FIG. 1 is a diagram of a network device in which systems and methods consistent with the present invention may be implemented.

FIG. 1 is a diagram of an exemplary system 100 in which systems and methods consistent with the present invention may be implemented. In one implementation consistent with the present invention, system 100 takes the form of a network device, such as a switch or a router.

System 100 may include network processors (NPs) 110 and a control processor (CP) 120 interconnected via a switching fabric 130. Switching fabric 130 may include conventional mechanisms that provide point-to-point or point-to-multipoint connections between network processors 110 and between control processor 120 and network processors 110. For example, switching fabric 130 may permit control processor 120 to communicate with network processors 110. Alternatively, control processor 120 may connect to network processors 110 via separate connections. Switching fabric 130 may also permit network processors 110 to communicate with one another to perform, for example, different portions of complex protocol processing.

Control processor 120 may include one or more controllers that may control the operation of network processors 110. For example, control processor 120 may send data for processing by one or more of network processors 110 and receive data processed by one or more of network processors 110.

Each of network processors 110 may include a software-programmable device, such as a digital network processor, that is optimized for data movement and the processing of packets and packet headers. The typical application of a network processor 110 may be to handle a single protocol layer, in a single direction, vastly simplifying the code complexity.

Generally, only a small number of operations need to be handled in a single network processor 110, and complex protocol processing is built from a number of network processors 110 in sequence. In this way, different higher-level protocols or different operations within a single protocol can be handed off to specialized "downstream" network processors 110. A router protocol stack for packet-forwarding, for example, may require a single packet to pass through a half-dozen or more network processors 110, handling ingress layer-1, ingress layer-2, forwarding, packet-scheduling, egress layer-2, and egress layer-1.

Figure 2:
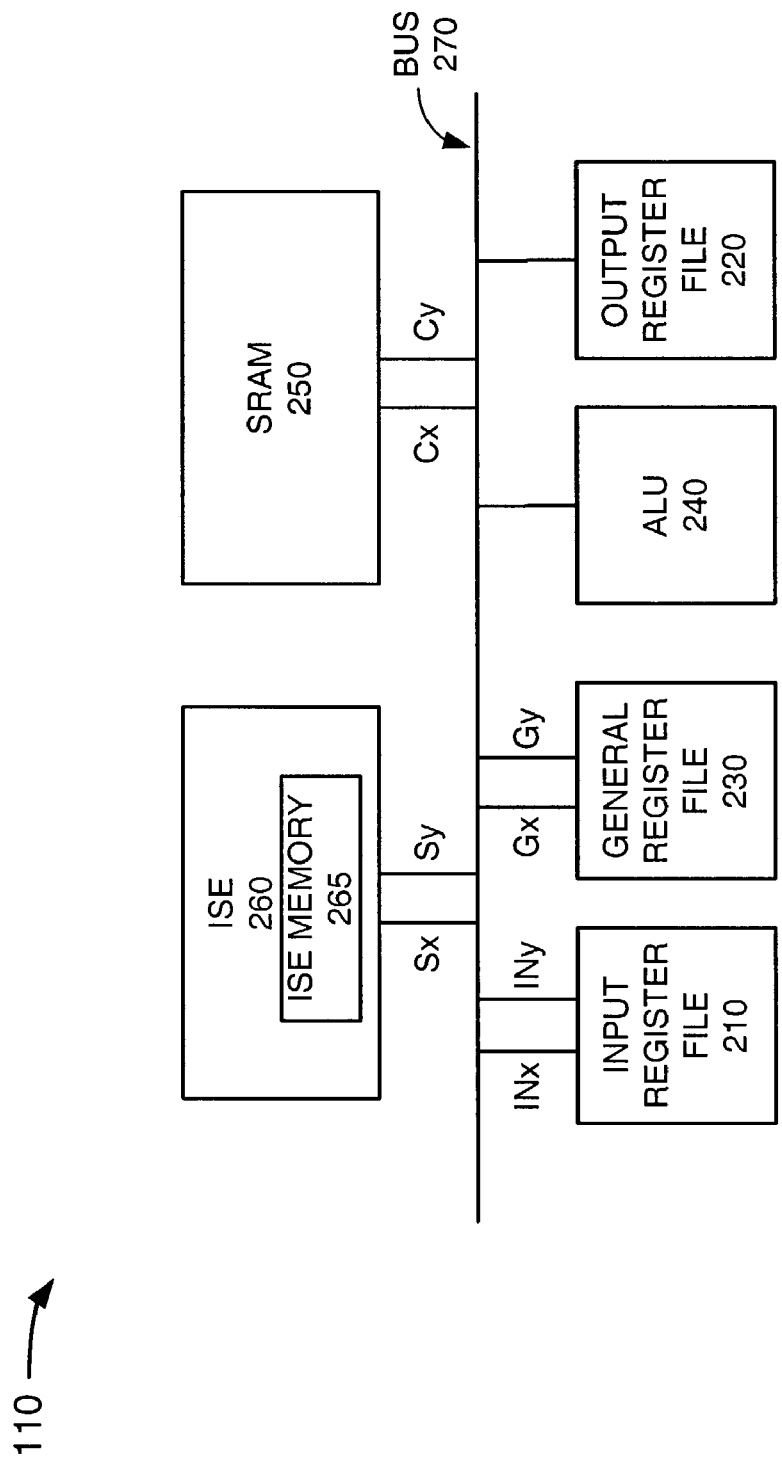
FIG. 2 is an exemplary diagram of a network processor of FIG. 1 according to an implementation consistent with the principles of the invention.

FIG. 2 is an exemplary diagram of a network processor 110 according to an implementation consistent with the principles of the invention. The internal architecture of network processor 110 may include a set of functional units interconnected by one or more wide data buses. Most of the functional units are organized as register files, often 2-ported. Each functional block in network processor 110 normally has one or two output buses that may be used as inputs to other functional blocks. Also, each functional block normally has one or two inputs and may include an associated multiplexer (not shown) that selects among the outputs of other functional blocks.

Network processor 110 may be programmed in an assembler programming language, though possibly with some additional tools to assist in parallelism extraction and register usage. In an implementation consistent with the present invention, network processor 110 may store approximately a thousand instructions. Network processor 110 may support four types of control structures: linear sequences of instructions, a multi-way branch, subroutine call/return, and an event-based dispatch mechanism.

As shown in FIG. 2, network processor 110 may include input register file 210, output register file 220, general register file 230, arithmetic logic unit (ALU) 240, internal static random access memory (SRAM) 250, and insert/shuffle/extract (ISE) unit 260 interconnected by one or more data buses 270. Data bus(es) 270 may include wide data buses that connect various functional units of network processor 110.

Input register file 210 may include a read-only memory (i.e., a memory from which functional units of network processor 110 can read, but not write). In one implementation, input register file 210 includes five 128-bit wide registers. Input register file 210 may connect to two (or more) pipeline input ports. Each of the input ports may include a first-in, first-out (FIFO) memory that temporarily stores chunks (i.e., data units) that await storage in input register file 210. Input register file 210 may also connect to a control input port to receive chunks from control processor 120 (FIG. 1).

Output register file 220 may include a write-only memory (i.e., a memory to which functional units of network processor 110 can write, but not read). In one implementation, output register file 220 includes six 128-bit wide registers. Output register file 220 may connect to two (or more) pipeline output ports. Each of the output ports may include a FIFO that temporarily stores chunks that await transmission to the next processing stage (e.g., the next network processor 110). Output register file 220 may also connect to a control output port to output chunks to control processor 120.

General register file 230 may include a large memory for storing temporary data and algorithmic constants and can be considered an adjunct to ALU 240 with a rich set of data paths to other functional units. In one implementation, general register file 230 includes 64 32-bit wide registers and may store data as 128-bit words. General register file 230 is large enough to handle the entire header of one or more packets simultaneously, thereby permitting pipelining of multiple packets in different stages of processing. Input register file 210 and output register file 220 also facilitate pipelining of multiple packets by not forcing data that is simply "passing through" into general register file 230 or ALU 240 bottlenecks.

ALU 240 may include a 32-bit ALU that supports most typical integer arithmetic and logical operations. ALU 240 may also include some additional specialized instructions for cyclic redundancy code (CRC) calculations, 1's-complement arithmetic, and the like.

SRAM 250 may include a 16 Mb SRAM organized as eight banks of 2 Mbits each. SRAM 250 may also include a controller (not shown) that controls access to the memory banks. This memory design supports the storage of a limited number of chunks into and out of SRAM 250 at line speed. Larger amounts of storage may lead to use of an external SRAM (not shown).

ISE unit 260 may perform a variety of multiplexing and demultiplexing tasks with byte and bit streams and may be used for Synchronous Optical Networking (SONET), High-Level Data Link Control (HDLC), and Digital Signal Level 3 (DS3) Layer 1 (L1) and Layer 2 (L2) protocol processing. ISE unit 260 may also perform arbitrary shifts, bit and byte-insertions and extractions, byte-oriented table lookups, cryptographic primitive operations, and possibly other functions. ISE unit 260 may include a small on-board memory 265 (e.g., RAM) that provides a multi-bank memory with byte, 32-bit, and 128-bit-wide bank organization. Memory 265 may be used as a staging area for SONET multiplexing and demultiplexing to lower the demand on SRAM 250. Memory 265 may also be used for byte-translation, bit-field operation control, and cryptographic functions.

Figure 3:
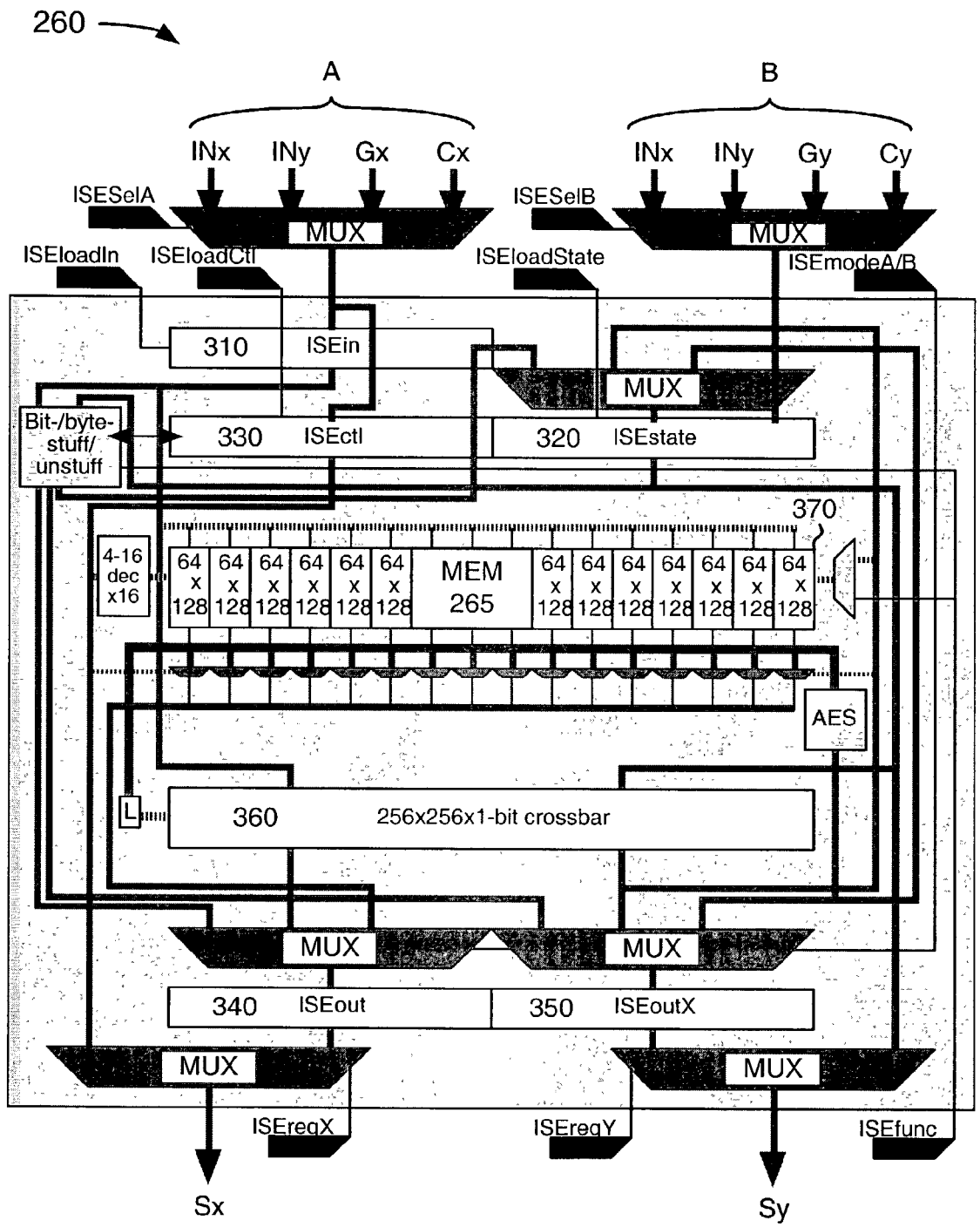
FIG. 3 is an exemplary diagram of the insert/shuffle/extract unit of FIG. 2 according to an implementation consistent with the principles of the invention.

FIG. 3 is an exemplary diagram of ISE unit 260 according to an implementation consistent with the principles of the invention. ISE unit 260 may include five specialized registers (ISEin 310, ISEstate 320, ISEctl 330, ISEout 340, and ISEoutX 350), a crossbar 360, and ISE memory 265. ISE unit 260 may also include other elements that aid in its operation, such as various multiplexers, bit-/byte-/stuff/unstuff logic, a decoder, a latch, and Advanced Encryption Standard (AES) logic. The bit-/byte-/stuff/unstuff logic includes conventional mechanisms that perform HDLC bit stuffing and unstuffing and Packet-Over-SONET (POS) byte stuffing and unstuffing. Information regarding conventional bit-/byte-/stuff/unstuff mechanisms can be found in W. Simpson, "PPP in HDLC-like Framing," Request for Comments 1662, IETF, 1994. The AES logic includes conventional mechanisms that implement byte-interchange data paths and XOR functions to perform AES round calculations. More information regarding conventional AES mechanisms is available from the National Institute of Standards and Technology (NIST).

ISE unit 260 includes two input ports: A and B. Each of the input ports feeds only specific registers (of registers 310-350). For example, the A input port feeds ISEin 310 and ISEctl 330 and can receive its input from INx or INy of input register file 210 (FIG. 2), Gx of general register file 230, or Cx of SRAM 250. The B input port feeds ISEstate 320 and can receive its input from INx or INy of input register file 210, Gy of general register file 230, or Cy of SRAM 250. It may be possible for both the G outputs of general register file 230 (i.e., Gx and Gy) and both the C outputs of SRAM 250 (i.e., Cx and Cy) to be set up to feed both the A and B input ports.

ISE unit 260 includes two output ports: Sx and Sy. Only specific registers (of registers 310-350) can output to specific output ports. For example, ISEout 340 and ISEctl 330 can output on output port Sx, while ISEoutX 350 and ISEstate 320 can output on output port Sy.

ISE unit 260 latches both its inputs and its outputs. Thus, any operations involving ISE unit 260 takes at least three cycles—one to set up the input register(s), one to perform the operation, and one to move the data from the output register(s). This can be illustrated as:

Cycle N: load inputs
Cycle N+1: perform operation
Cycle N+2: select outputs for Sx and Sy output ports.

All inputs to ISE unit 260 may be latched at the end of the cycle they are loaded and can be operated on in the following cycle. The internal pipelining of ISE unit 260 allows registers to be loaded and used for an operation on the same cycle (much like conventional register files that can be read at the beginning of a cycle and written at the end of the same cycle).

Each of the specialized registers (i.e., registers 310-350) may include a 128-bit register. ISEin 310 may include a write-only register used to feed data into most ISE functions. ISEstate 320 may include a read/write register that is written on every cycle, either from the B input port (using ISEloadState—described below) or implicitly by the ISE function being used. Some functions do not produce a result in ISEstate 320 and, in this case, the result is undefined if the register is not loaded from the B port. ISEstate 320 provides a data input to many ISE functions and a control value for a few others. ISEstate 320 is often an output value for ISE operations.

ISEctl 330 may include a read/write register that is used for miscellaneous ISE function parameters and sometimes serves as an auxiliary state register. ISEout 340 may include a read-only register that holds the result from most ISE functions. ISEoutX 350 may include a read-only register that serves as an extension of ISEout 340 for certain operations that produce a 256-bit result.

Unlike some of the other functional units, the ISE registers (310-350) may not be organized as a register file, but as individual, function-specific registers. These registers store 128-bit values in ISE unit 260 and, in many instances, may not be loaded with smaller units (e.g., 32-bit or 8-bit loads). The various registers are associated with specific input or output buses. The writable ones can only be loaded from one of the two ISE input ports (A, B) and the readable ones can only be read via one of the two ISE output ports (Sx, Sy).

Crossbar 360 may include a 256×256×1-bit crossbar used to support one or more ISE functions. ISE memory 265 may include 16 64×128 fast memories 370 that serve one of three functions:

(1) as a set of high-bandwidth scratchpad memories for byte-interleaving and de-interleaving operations (primarily for SONET channel multiplexing and demultiplexing). In this mode, each memory 370 is associated with a single input byte that can be stored in a single one of 16 byte lanes. A byte lane refers to one of the 16 bytes in the 128-bit-wide word in memory 370. Each byte lane within a memory 370 is also associated with a single output byte, which may read the corresponding lane from any of the 16 memories 370.

(2) as a set of control memories to define ISE bit-exchanging operations. In this mode, all memories 370 receive the same address. Each byte of the resulting 2048-bit result controls one of the 256 output bit multiplexers, selecting one of 256 source bits based on the memory's output value.

(3) as a set of byte-indexed table memories. In this mode, memories 370 are also associated with a single input byte. The input byte supplies the six low bits to address memory 370 and the two high bits to select one 32-bit word from the 128-bit result, thereby producing a 32-bit result for each byte. This 32-bit value for each input byte can be used, for example, by the cryptographic logic (AES). The table lookup operation, when used in conjunction with AES, may program the memories as "S-boxes." In a variant of this mode, the low four bits of the input byte address are used to address memory 370 with the high four bits selecting one of the 16 output bytes. In this alternate implementation, the two upper memory address bits may be supplied from ISEfunc inputs, selecting one of 4 possible tables. This alternate implementation differs from the AES table lookup in that each table output result is 8 bits wide, not the 32 bits used for AES.

Figure 4:
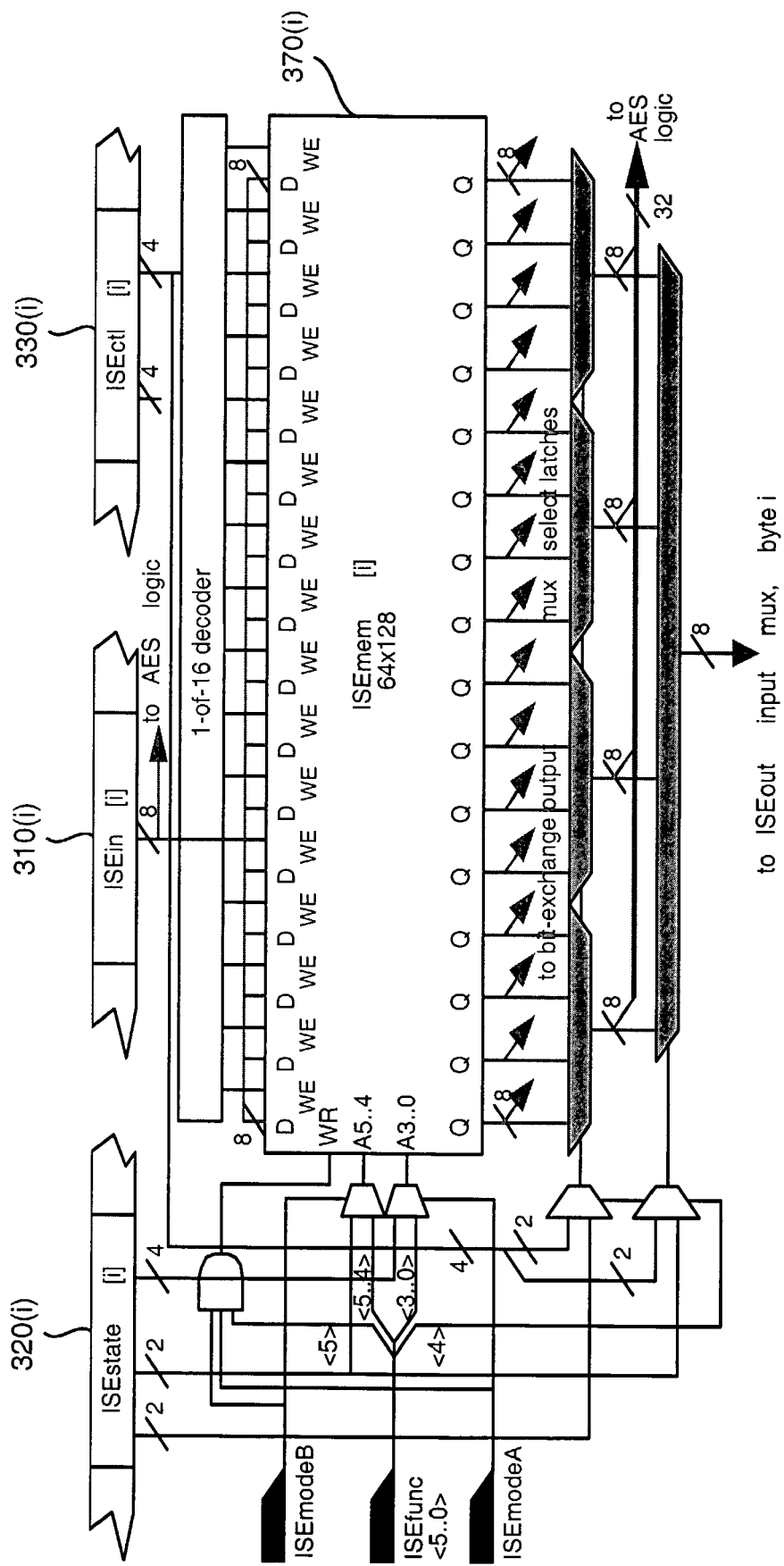
FIG. 4 is an exemplary diagram of one of the memories of FIG. 3 and surrounding logic according to an implementation consistent with the principles of the invention.

FIG. 4 is an exemplary diagram of one of memories 370 and surrounding logic according to an implementation consistent with the principles of the invention. The particular memory 370($i$) illustrated in FIG. 4 is the ith memory in ISE memory 265, where $0 \leq i \leq 15$. Memory 370($i$) operates based on the ith byte of ISEstate 320($i$), ISEin 310($i$), and ISEctl 330($i$).

As shown in FIG. 4, memory 370($i$) receives data from ISEin 310($i$), control information from ISEctl 330($i$), and address and control information from ISEstate 320($i$). Other logic, such as 1-of-16 decoder and various multiplexers and logic gates facilitate the writing and reading of data to and from memory 370($i$).

Memory 370($i$) can be shared between ISE functions to the extent that there is sufficient address space. SONET channelization at OC-192 requires 12 or fewer of the 64 addresses. OC-768 would use up to 48 of the addresses. Each bit-exchange operation requires one address. Table lookups for AES cryptography occupy the entire 64 entries and, thus, prohibit other functions. Table lookups for other purposes use 16 memory locations per table.

It may also be possible to support a mode where the low 4 bits of each byte are supplied to the address inputs, with the high two address bits coming from the function code, and the high 4 bits of each byte select one of the 16 byte lanes. This variant table mode might require 16 addresses to be allocated per table.

Returning to FIG. 3, ISE unit 260 may receive certain control signals for controlling its operation. The control signals may include, for example, ISESelA, ISESelB, ISEloadIn, ISEloadCtl, ISEloadState, ISEmodeA/B, ISEfunc[5], ISEregX, and ISEregY. ISESelA may include two bits used to select one of INx, INy, Gx, or Cx as the source for the A input port. ISESelB may include two bits used to select one of INx, INy, Gy, or Cy as the source for the B input port. ISEloadIn may include one bit used to load ISEin 310 from the A input port. ISEloadCtl may include one bit used to load ISEctl 330 from the A input port. ISEloadState may include one bit used to load ISEstate 320 from the B input port. If, for example, ISEloadState is not asserted, then ISEstate 320 may be loaded from the internal datapath, according to the function selected.

ISEmodeA/B may include two bits used to control the major mode of ISE unit 260. ISEmodeB selects whether the output of ISE unit 260 is derived from the memory outputs (if=1) or logic functions (if=0). ISEmodeA selects between bit-exchange (if=0) and bit-stuffing (if=1) in logic-function mode. In memory access mode, ISEmodeA selects between table lookup (if=0) and SONET or AES operations (if=1).

ISEfunc may include five bits used to control the functions performed by ISE unit 260. For example, if ISEmodeA/B is 00, the operation is a bit-movement function, and ISEfunc<5 . . . 0> supplies a memory address to control the function. ISEfunc<5> enables writing to memory 265 when ISEmodeA/B=11. ISEfunc<4> controls whether the memory output byte selects come from ISEstate (=0, for table and AES operations) or ISEctl (=1, for SONET multiplexing/demultiplexing). ISEfunc<1 . . . 0> are used by AES and stuffing/unstuffing modes to distinguish sub-functions. When ISEmodeB=1, ISEfunc<3> enables loading of ISEout 340 and ISEfunc<2> enables loading of ISEoutX 350 and ISEstate 320.

ISEregX may include one bit used to select either ISEout 340 or ISEctl 330 for presentation at the Sx output port. ISEregY may include one bit used to select either ISEoutX 350 or ISEstate 320 for presentation at the Sy output port.

The functions performed by ISE unit 260 may be broken down into five general types: (1) bit and byte-stuffing and unstuffing operations (for HDLC and POS); (2) bit movement operations, such as shifts, field insertions and extractions, sign extension, set-to-1 and set-to-0, and the like; (3) space/time byte switching (used for SONET channel multiplexing and demultiplexing); (4) byte-wise table lookup; and (5) cryptography primitives. These functions are described in more detail below and are summarized in Table 1:

TABLE 1

| Function | ISEmode | ISEfunc<5..0> | Inputs | Outputs | State |
|---|---|---|---|---|---|
| HDLCstuff | 01 | xxx00 | ISEin, ISEstate | ISEout, ISEoutX | ISEstate, ISEctl |
| HDLCunstuff | 01 | xxx01 | ISEin, ISEstate | ISEout, ISEoutX | ISEstate, ISEctl |
| POSstuff | 01 | xxx10 | ISEin, ISEstate | ISEout, ISEoutX | ISEstate, ISEctl |
| POSunstuff | 01 | xxx11 | ISEin, ISEstate | ISEout, ISEoutX | ISEstate, ISEctl |
| BitExchange | 00 | function number | ISEin, ISEstate | ISEout, ISEoutX (=ISEstate) | ISEstate |
| ByteDistribute | 11 | 1000x | ISEin, ISEstate, ISEctl | — | — |
| ByteCollect | 11 | 0110x | ISEin, ISEstate, ISEctl | ISEout | — |
| ByteLookup | 10 | 0010x | ISEstate | ISEout | — |
| AESRound | 11 | 00010 | ISEstate, ISEin | ISEoutX (=ISEstate) | ISEstate |

TABLE 1-continued

| Function | ISEmode | ISEfunc<5..0> | Inputs | Outputs | State |
|---|---|---|---|---|---|
| AESFinal | 11 | 00011 | ISEstate, ISEin | ISEoutX (=ISEstate) | ISEstate |
| ISEnop | 10 | 0000x | | | |

ISEout 340, ISEoutX 350, ISEstate 320, and ISEctl 330 do not change unless the selected ISE operation changes them explicitly. The particular registers (of registers 310-350) affected by an operation are shown in the table above.

Due to the probable tight timing inside ISE unit 260, there may actually be multiple copies of various registers, in different functional paths. These may be concealed from the programmer, but selecting the correct copy of an output register may require that ISEmodeA/B be pipelined in the hardware to control the output multiplexers on subsequent cycles (N+2 or later) where the output of the operation is being selected to Sx or Sy. The bit-movement operation will probably require that the ISEfunc value be supplied on cycle N, rather than cycle N+1, due to internal pipelining on the output of memory 265. It may occur that the function lookup in memory 265 and the 256-input multiplexers create a propagation path longer than a single cycle, so ISEfunc may need to be pipelined ahead (e.g., one cycle earlier). In this case, ISE unit 260 may pipeline the correct output register selection values from cycle N, if multiple copies of the output registers are used. The HDLC bit-stuffing operation may need two cycles to complete. In this case, the second operation cycle will likely have a different ISEfunc value.

Bit and Byte-Stuffing/Unstuffing

This subset of ISE functions is specialized for handling HDLC bit-stuffing and unstuffing and POS byte-stuffing and unstuffing. There are four operations in this function group: (1) HDLC bit-stuffing; (2) HDLC bit-unstuffing; (3) POS byte-stuffing; and (4) POS byte-unstuffing. All four operations are stateful and operate similarly. The mode of operation for these functions may be to initialize ISE unit 260 with the state for a particular context, pass four 128-bit quantities from a single input chunk through ISE unit 260, using the same operation each time and saving the result, and then unload the final ISE state. The POS operations may take a single clock cycle per stuffing/unstuffing operation, while the HDLC operations may have long and complex carry chains and may likely take two clock cycles per operation.

If other ISE operations must be interspersed with the stuffing and unstuffing operations, the state may be loaded before each series of stuffing (or unstuffing) operations and saved after each series has finished. It may be better to do these operations in groups of 4 or more to keep the state loading/saving overhead to a minimum.

Each stuffing operation may result in either one or two 128-bit output values (data-dependent). Each unstuffing operation produces either zero or one 128-bit output value (again, data-dependent). Both operations also leave 0-127 bits of partial result as part of the ISE state. If only one 128-bit value results from the operation, the ISEout 340 register may store the output value. If two 128-bit values are produced, the first value (in network transmission order) may be stored in ISEout 340 and the subsequent value in ISEoutX 350.

The state for the stuffing/unstuffing operations contains four values: Residue, ResidueCount, OutputValid, and EscapePending. Residue may include a 128-bit value that contains from 0 to 127 bits of partial output left over from the prior operation in the context. The Residue value may be stored in the ISEstate 320 register, and may be left-justified. ResidueCount may include an 8-bit value that indicates the number of valid bits in the Residue. ResidueCount may be stored as bits <15 . . . 8> of ISEctl 330 register. OutputValid may include a 4-bit status value that indicates whether the last four stuffing/unstuffing operations produced one or two 128-bit output values on each operation (for stuffing) or zero or one 128-bit output results (for unstuffing). The OutputValid value may be zeroed when ISE unit 260 is initialized to handle a chunk. OutputValid may be stored as bits <3 . . . 0> of ISEctl 330 register. The EscapePending value may be used for POS byte-unstuffing. The EscapePending value may be stored as bit <31> of ISEctl 330 register.

The OutputValid status field may reduce branching while performing stuffing/unstuffing operations. Stuffing each 128-bit input value can produce either one or two 128-bit output values (as well as leaving some amount of output in Residue). In order to avoid having to supply a set of result flags from ISE unit 260 to the branch logic and to simplify the branch logic, the OutputValid field is designed to be used in a 16-way branch (by passing it through ALU 240 and doing a branch on the low 4 ALUout bits) after performing four ISE stuffing or unstuffing operations on a single chunk. Normally, all the possible results of a stuffing or unstuffing operation may be stored in a set of general registers 230, and then branch on the value from OutputValid to select which registers actually need to be stored (or output).

When processing multiple data streams (e.g., channelized POS), the Residue, ResidueCount, and EscapePending values may be saved as part of each stream's context, while OutputValid can be set to zero when the context state is loaded into ISE unit 260. Correct use of OutputValid relies on doing sequential operations on the same data stream for up to four successive operations, with no other intervening ISE operations.

HDLC Operations

For the HDLC operations, the order of bits within a byte and the order of bytes within the 128-bit input and output data words is significant. Within a byte, HDLC transmits data from low-order bit to high-order bit. If the order of byte transmission within a 128-bit word is from high-order byte to low-order byte (as is typically done in IETF-standardized protocols), the 128-bit input and output values from the operations may need to have the byte order reversed within the 128-bit word before processing of the input, and again before generation of the output. This may be done statically, by the order in which the input (ISEin 310) and output (ISEout 340 and ISEoutX 350) bytes are connected to the 128-bit-wide HDLC logic block input and output ports. This ensures that the HDLC bit-stuff/unstuff logic operates on sequential bits in the order of actual transmission. It may also be done programmatically, by using the bit-exchange operation of this unit to re-order the input and output bits, as separate pre- and post-stuff/unstuff operations.

The basic HDLC bit-stuffing operation looks for a sequence of 5 sequential 1-bits, and inserts a zero after the 5th one; then starts counting 1-bits from 0 again. This prevents the output sequence from containing any sequence of 6 or more sequential 1-bits. The HDLC-unstuffing operation reverses the above, deleting a 0-bit found after 5 sequential 1-bits, and then starts counting 1-bits from zero and repeating.

Figure 5A:
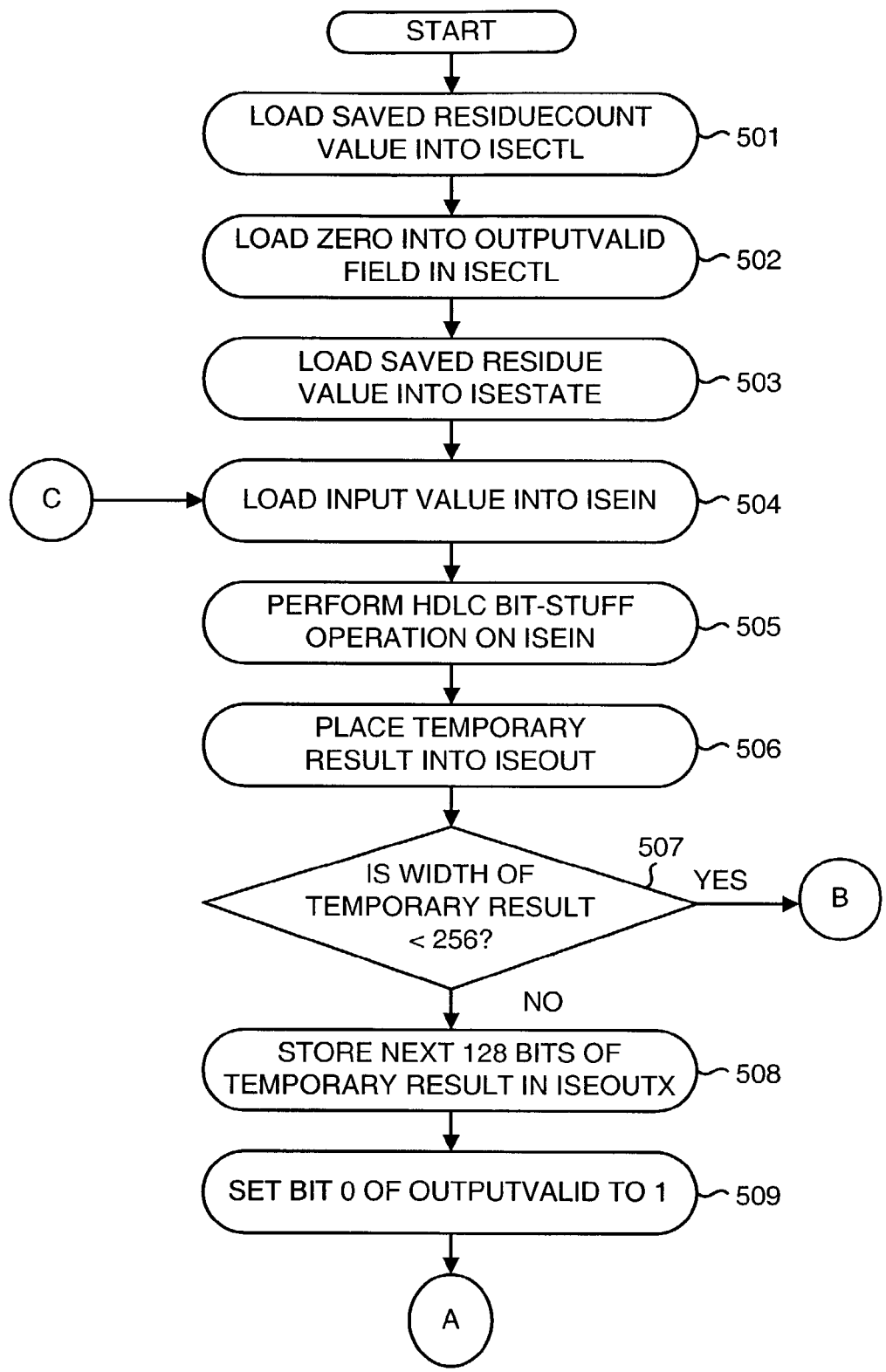
FIGS. 5A-5H are flowcharts of exemplary processing for performing bit/byte stuffing/unstuffing functions according to an implementation consistent with the principles of the invention.
Figure 5B:
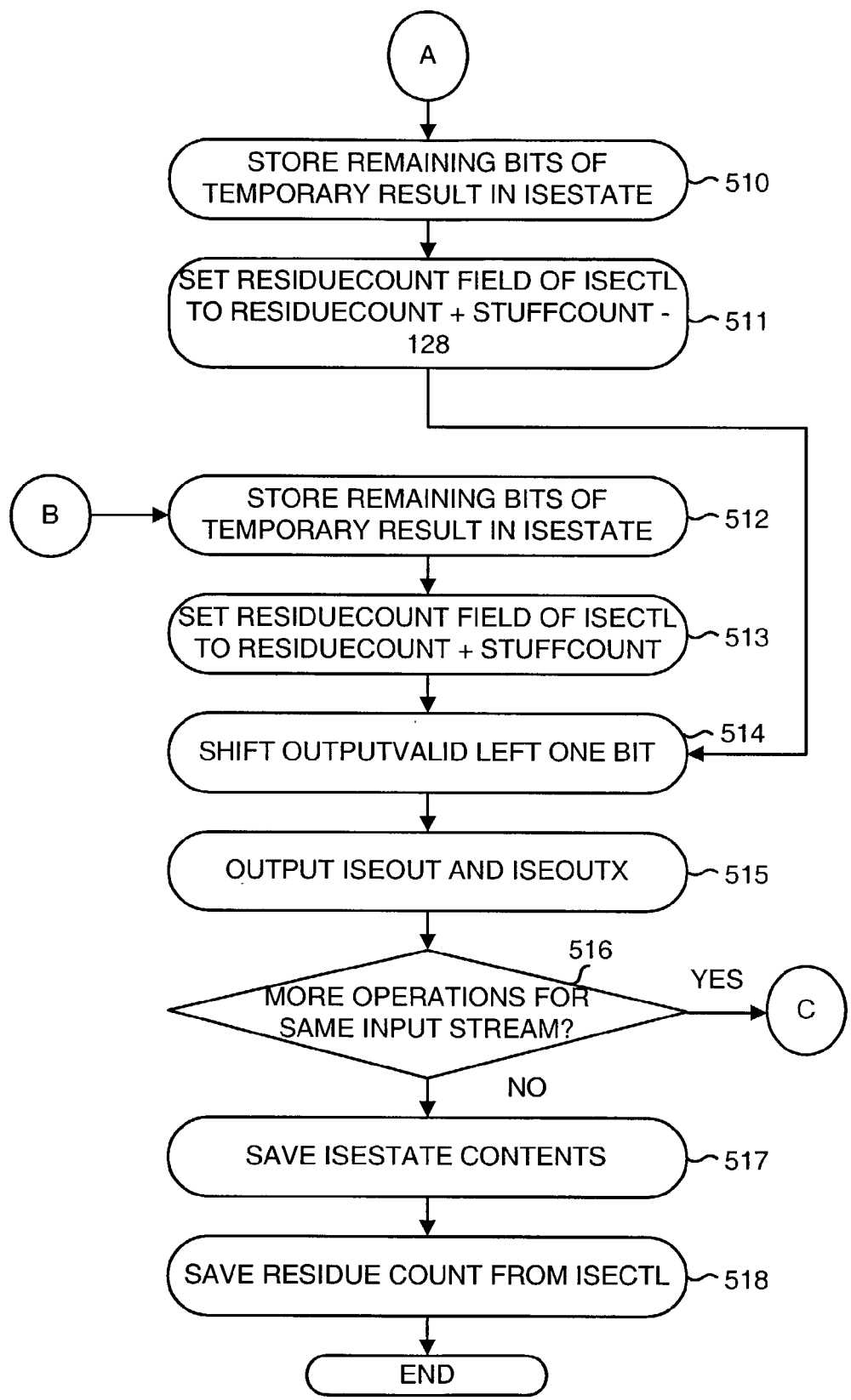

FIGS. 5A and 5B are flowcharts of exemplary processing for performing HDLC bit-stuffing according to an implementation consistent with the principles of the invention. Processing may begin with the loading of values into ISEin 310, ISEstate 320, and ISEctl 330. For example, the saved ResidueCount value may be stored in a field within ISEctl 330 (act 501) (FIG. 5A). A zero value may be stored in the OutputValid field in ISEctl 330 (act 502). The saved Residue value may be stored in ISEstate 320 (act 503). An input value may be stored in ISEin 310 (act 504).

The HDLC bit-stuff operation may then be performed on the contents of ISEin 310, using the last four bits of Residue and ResidueCount as additional inputs (in case a sequence of five 1-bits spans the previous input word and the current input word) (act 505). The result of the HDLC bit-stuff operation is an output value (HDLCstuffOut) of up to 128+26 bits (where 26 is the most zero bits that the process can insert into a 128-bit value, when the last four bits of the Residue value are also included). The HDLC bit-stuff operation also produces a count of zeros inserted (StuffCount).

The valid ResidueCount bits of the Residue may be concatenated with the valid (128+StuffCount) bits of HDLCstuffOut to get a temporary result of (ResidueCount+128+StuffCount) bits. The first 128 bits of the temporary result may be stored in ISEout 340 (act 506). It may then be determined whether (ResidueCount+128+StuffCount) is less than 256 (act 507). If not, the next 128 bits of the temporary result may be stored in ISEoutX 350 (act 508). Bit 0 of OutputValid may then be set to "1" (act 509). The remaining (ResidueCount+StuffCount−128) bits of the temporary result (forming the new Residue value) may be stored in ISEstate 320 (act 510) (FIG. 5B). The ResidueCount field of ISEctl 330 may be loaded with (ResidueCount+StuffCount−128) (act 511).

If (ResidueCount+128+StuffCount) is less than 256 (act 507), then the remaining (ResidueCount+StuffCount) bits of the temporary result (forming the new Residue value) may be stored in ISEstate 320 (act 512). The ResidueCount field of ISEctl 330 may then be loaded with (ResidueCount+StuffCount) (act 513). OutputValid may then be shifted left by one bit (act 514). The contents of ISEout 340 and ISEoutX 350 may be output on output ports Sx and Sy, respectively (act 515).

It may then be determined whether more operations are to be performed on the same input stream (up to four inputs can be processed in sequence due to the size of the OutputValid field) (act 516). If so, processing may continue at act 504 with the loading of an input value into ISEin 310. Otherwise, the contents of ISEstate 320 may be saved, as well as the ResidueCount value from ISEctl 330 (acts 517 and 518). The OutputValid field may also be examined to determine which output cycles had valid data on output port Sy.

Several of the above-described acts may be performed in parallel or may be pipelined. For example, acts 501-503 may be performed in parallel; acts 505-515 may be performed in parallel, or may be pipelined internally as several acts; acts 517 and 518 can be performed in parallel. Further, act 504 and acts 505-515 may be pipelined, loading ISEin 310 with input word i+1 while processing input word i. Similarly, act 515 may be pipelined, outputting the results of input word i−1 while processing input word i.

Figure 5C:
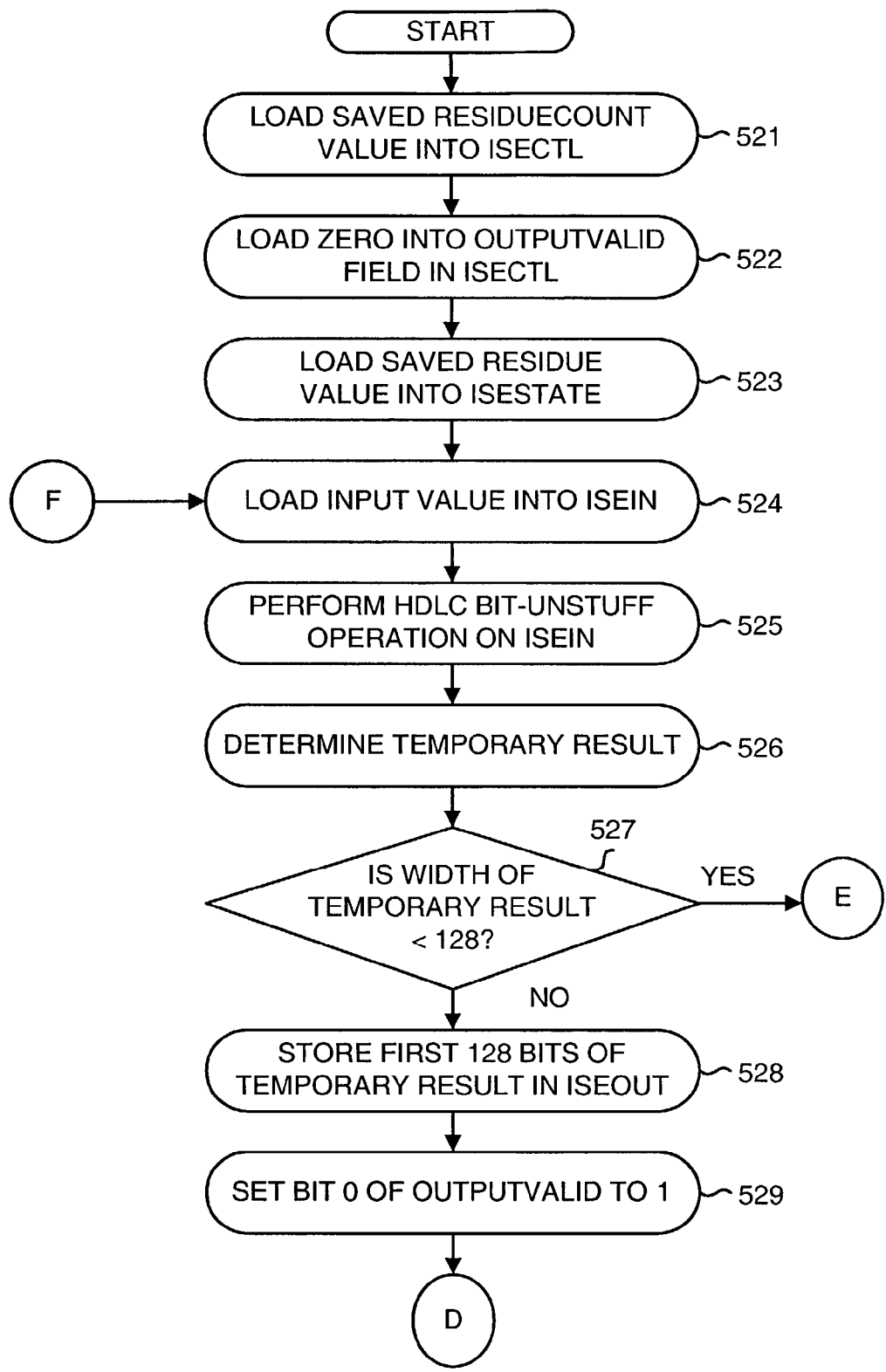
Figure 5D:
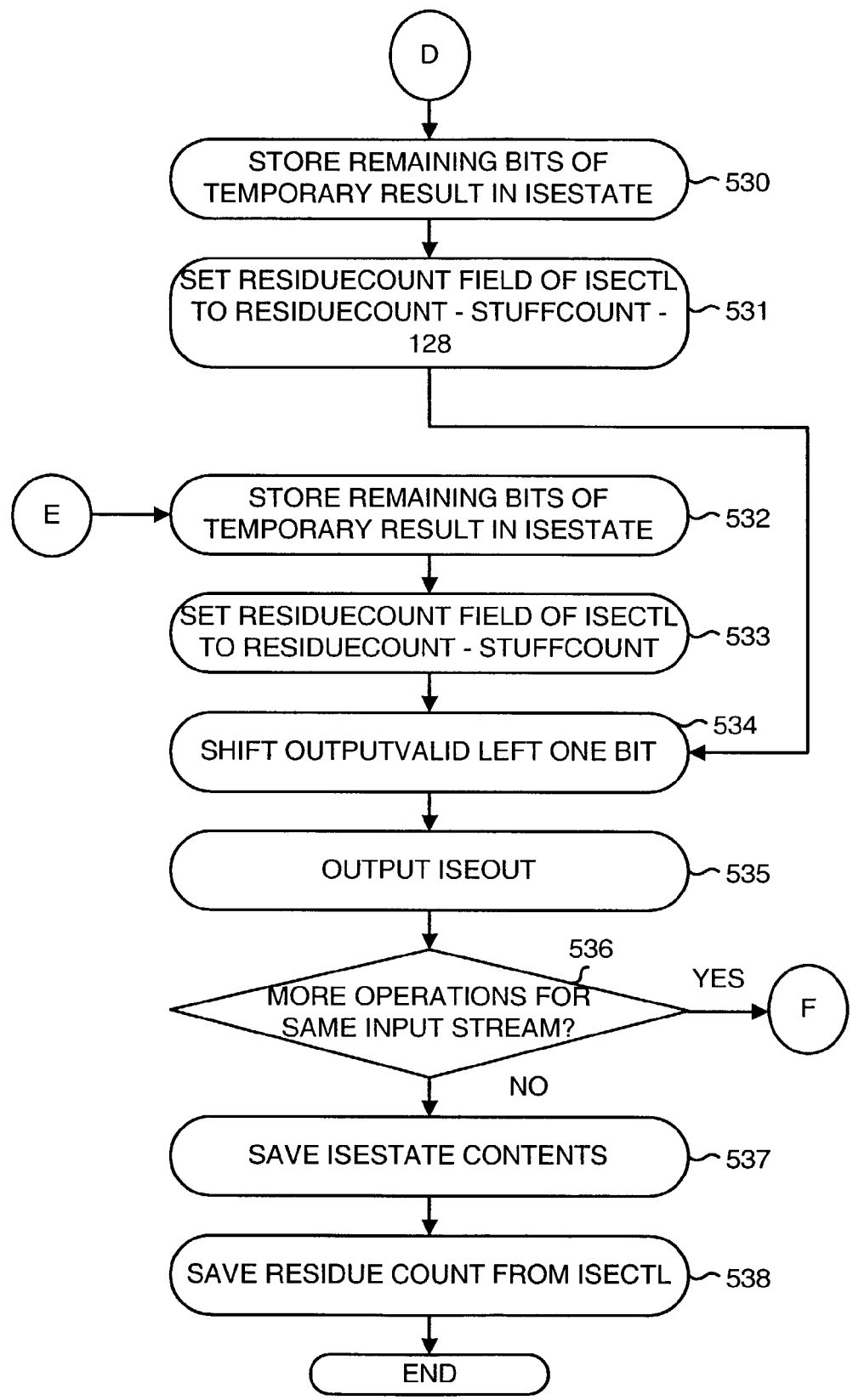

FIGS. 5C and 5D are flowcharts of exemplary processing for performing HDLC bit-unstuffing according to an implementation consistent with the principles of the invention. Processing may begin with the loading of values into ISEin 310, ISEstate 320, and ISEctl 330. For example, the saved ResidueCount value may be stored in a field within ISEctl 330 (act 521) (FIG. 5C). A zero value may be stored in the OutputValid field in ISEctl 330 (act 522). The saved Residue value may be stored in ISEstate 320 (act 523). An input value may be stored in ISEin 310 (act 524).

The HDLC bit-unstuff operation may then be performed on the contents of ISEin 310, using the last five bits of Residue and ResidueCount as additional inputs (in case a sequence of five 1-bits followed by a 0 bit spans the previous input word and the current input word) (act 525). The result of the HDLC bit-unstuff operation is an output value (HDLCstuffOut) of up to 128−22 bits (where 22 is the most zero bits that the process can delete from a 128-bit value, when the last five bits of the Residue value are also included). The HDLC bit-unstuff operation also produces a count of zeros deleted (StuffCount).

The valid ResidueCount bits of the Residue may be concatenated with the valid (128−StuffCount) bits of HDLCstuffOut to get a temporary result of (ResidueCount+128−StuffCount) bits (act 526). It may then be determined whether (ResidueCount+128−StuffCount) is less than 128 (act 527). If not, the first 128 bits of the temporary result may be stored in ISEout 340 (act 528). Bit 0 7534 of OutputValid may then be set to "1" (act 529). The remaining (ResidueCount−StuffCount−128) bits of the temporary result (forming the new Residue value) may be stored in ISEstate 320 (act 530) (FIG. 5D). The ResidueCount field of ISEctl 330 may be loaded with (ResidueCount−StuffCount−128) (act 531).

If (ResidueCount+128−StuffCount) is less than 128 (act 527), then the remaining (ResidueCount−StuffCount) bits of the temporary result (forming the new Residue value) may be stored in ISEstate 320 (act 532). The ResidueCount field of ISEctl 330 may then be loaded with (ResidueCount−StuffCount) (act 533). OutputValid may then be shifted left by one bit (act 534). The contents of ISEout 340 may be output on output port Sx (act 535).

It may then be determined whether more operations are to be performed on the same input stream (up to four inputs can be processed in sequence due to the size of the OutputValid field) (act 536). If so, processing may continue at act 524 with the loading of an input value into ISEin 310. Otherwise, the contents of ISEstate 320 may be saved, as well as the ResidueCount value from ISEctl 330 (acts 537 and 538). The OutputValid field may also be examined to determine which output cycles had valid data on output port Sx.

Several of the above-described acts may be performed in parallel or may be pipelined. For example, acts 521-523 may be performed in parallel; acts 525-535 may be performed in parallel, or may be pipelined internally as several acts; acts 537 and 538 can be performed in parallel. Further, act 5242 and acts 525-535 may be pipelined, loading ISEin 310 with input word i+1 while processing input word i. Similarly, act 535 may be pipelined, outputting the results of input word i−1 while processing input word i.

POS Operations

The basic POS byte-stuffing operation looks for "flag" byte (0x7e) or "control escape" byte (0x7d), and replaces it with a two-byte escape sequence (0x7d 0x5e for flags, 0x7d 0x5d for control-escapes). This prevents the output sequence from containing any flag bytes, or any control escape bytes taken directly from the input. The POS byte-unstuffing operation reverses the above, replacing the sequence 0x7d 0x5e with a single byte 0x7e, and the sequence 0x7d 0x5d with a single byte value 0x7d.

Figure 5E:
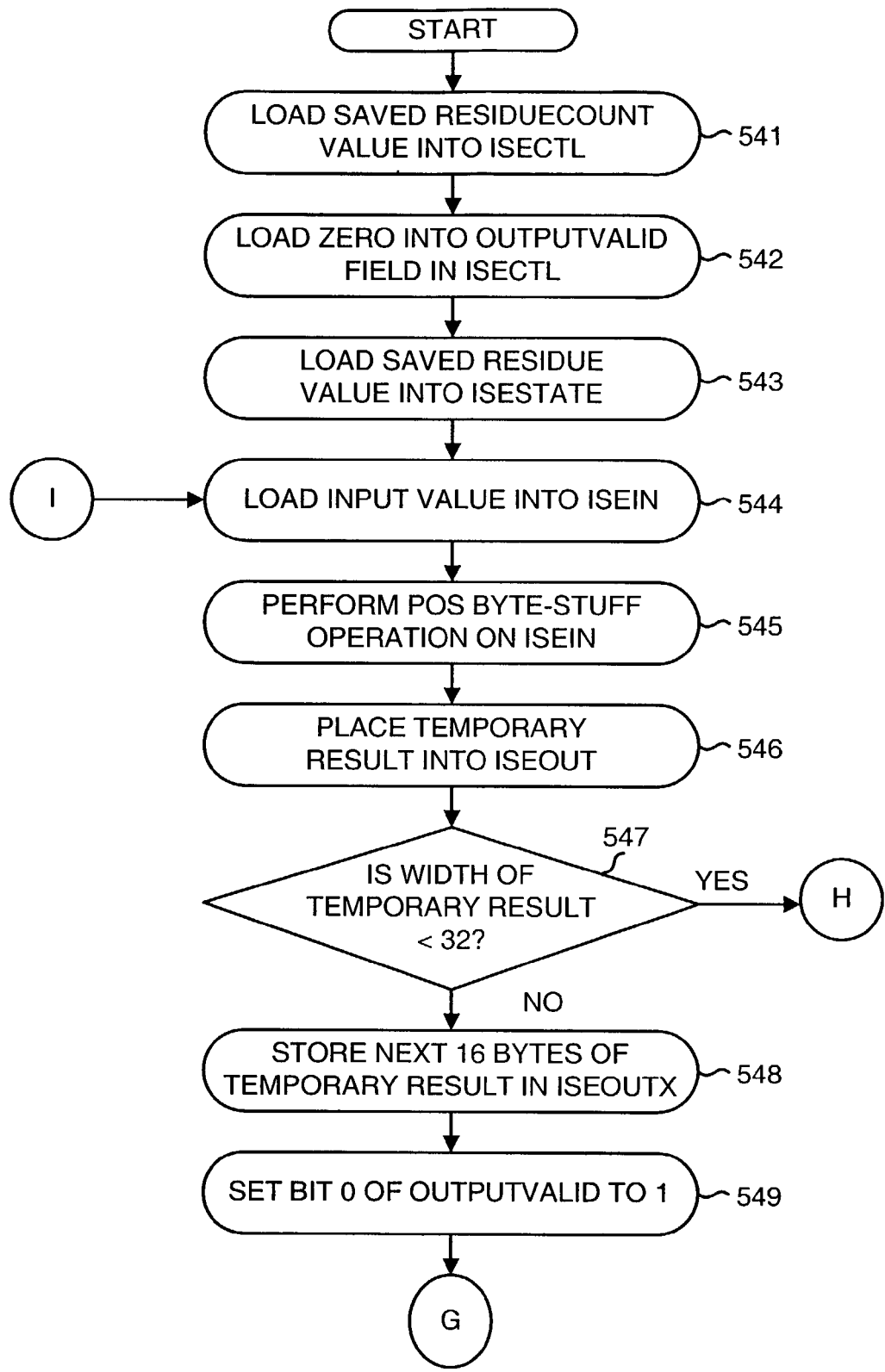
Figure 5F:
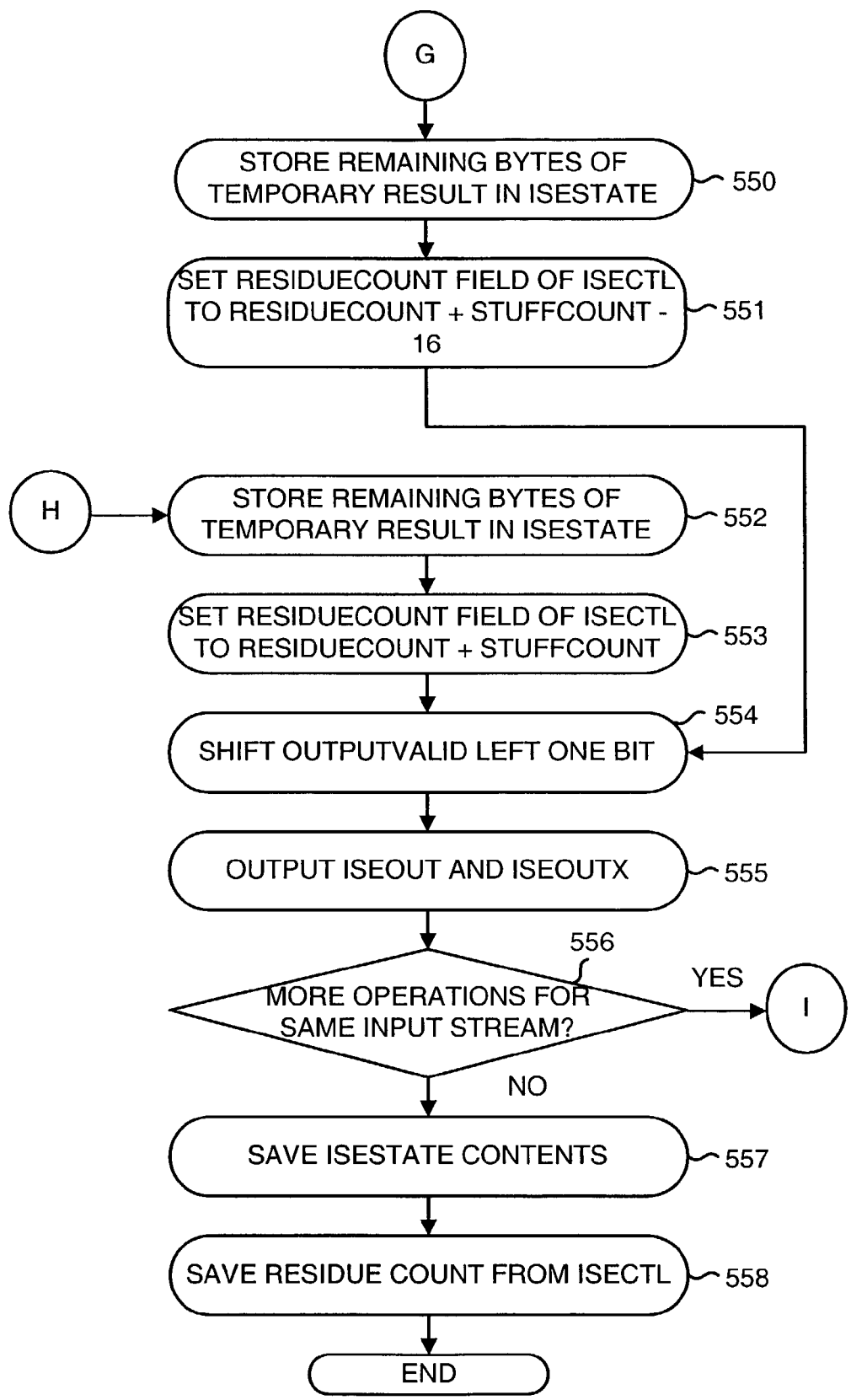

FIGS. 5E and 5F are flowcharts of exemplary processing for performing POS byte-stuffing according to an implementation consistent with the principles of the invention. Processing may begin with the loading of values into ISEin 310, ISEstate 320, and ISEctl 330. For example, the saved ResidueCount value may be stored in a field within ISEctl 330 (act 541) (FIG. 5E). A zero value may be stored in the OutputValid field in ISEctl 330 (act 542). The saved Residue value may be stored in ISEstate 320 (act 543). An input value may be stored in ISEin 310 (act 544).

The POS byte-stuff operation may then be performed on the contents of ISEin 310, replacing any instances of the single bytes 0x7e or 0x7d with the two-byte sequence 0x7d 0x5e and 0x7d 0x5d, respectively (act 545). The result of the POS byte-stuff operation is an output value (POSstuffOut) of up to 16+16 bytes (where 16 is the most bytes that the process can add to a 16-byte input value). The POS byte-stuff operation also produces a count of bytes inserted (StuffCount).

The valid ResidueCount bytes of the Residue may be concatenated with the valid (16+StuffCount) bytes of POSstuffOut to get a temporary result of (ResidueCount+16+StuffCount) bytes (act 546). The first 16 bytes of the temporary result may be stored in ISEout 340. It may then be determined whether (ResidueCount+16+StuffCount) is less than 32 (act 547). If not, the next 16 bytes of the temporary result may be stored in ISEoutX 350 (act 548). Bit 0 of OutputValid may then be set to "1" (act 549). The remaining (ResidueCount+StuffCount−16) bytes of the temporary result (forming the new Residue value) may be stored in ISEstate 320 (act 550) (FIG. 5F). The ResidueCount field of ISEctl 330 may be loaded with (ResidueCount+StuffCount−16) (act 551).

If (ResidueCount+16+StuffCount) is less than 32 (act 547), then the remaining (ResidueCount+StuffCount) bytes of the temporary result (forming the new Residue value) may be stored in ISEstate 320 (act 552). The ResidueCount field of ISEctl 330 may then be loaded with (ResidueCount+StuffCount) (act 553). OutputValid may then be shifted left by one bit (act 554). The contents of ISEout 340 and ISEoutX 350 may be output on output ports Sx and Sy, respectively (act 555).

It may then be determined whether more operations are to be performed on the same input stream (up to four inputs can be processed in sequence due to the size of the OutputValid field) (act 556). If so, processing may continue at act 554 with the loading of an input value into ISEin 310. Otherwise, the contents of ISEstate 320 may be saved, as well as the ResidueCount value from ISEctl 330 (acts 557 and 558). The OutputValid field may also be examined to determine which output cycles had valid data on output port Sy.

Several of the above-described acts may be performed in parallel or may be pipelined. For example, acts 541-543 may be performed in parallel; acts 545-555 may be performed in parallel, or may be pipelined internally as several acts; acts 557 and 558 can be performed in parallel. Further, act 544 and acts 545-555 may be pipelined, loading ISEin 310 with input word i+1 while processing input word i. Similarly, act 555 may be pipelined, outputting the results of input word i−1 while processing input word i.

Figure 5G:
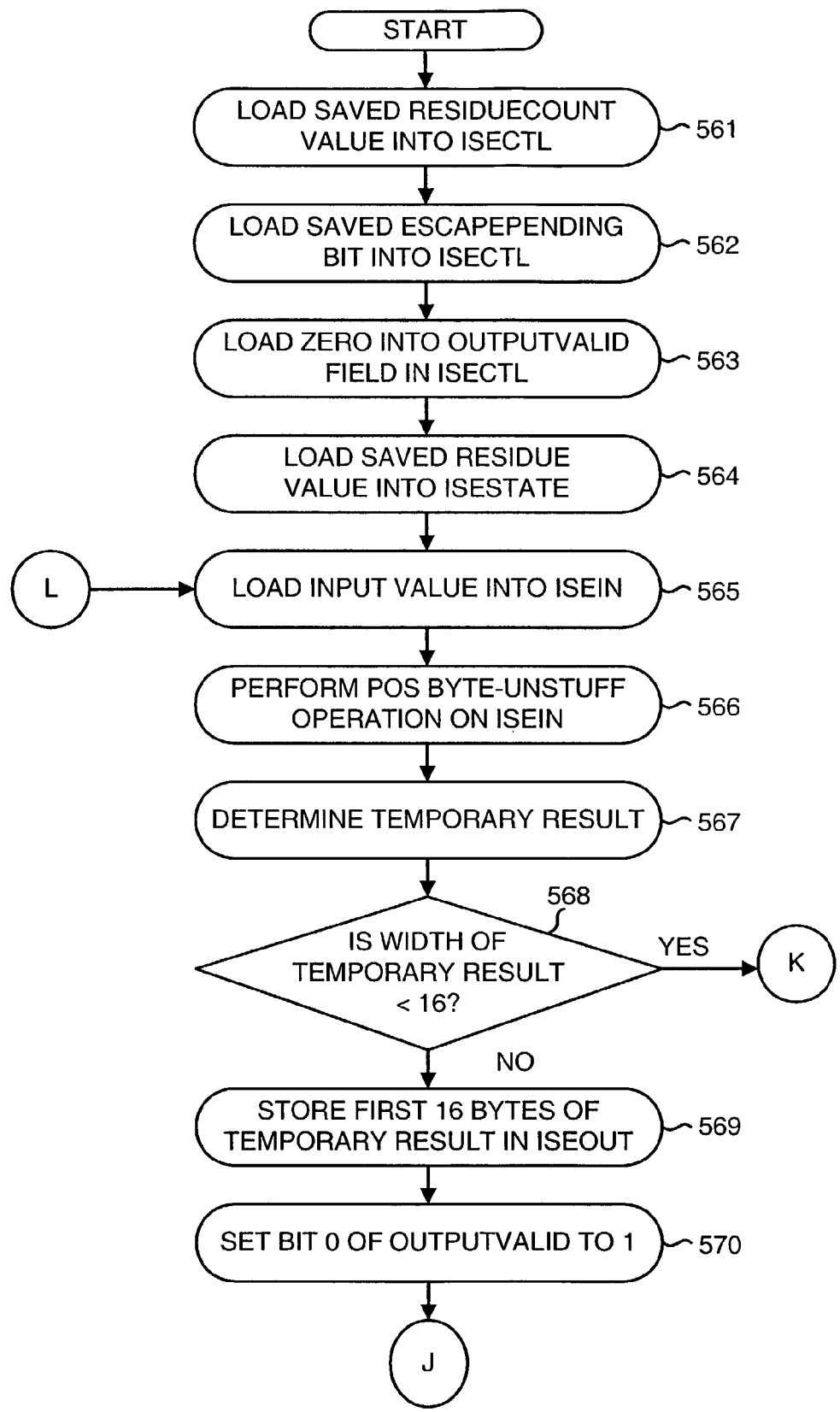
Figure 5H:
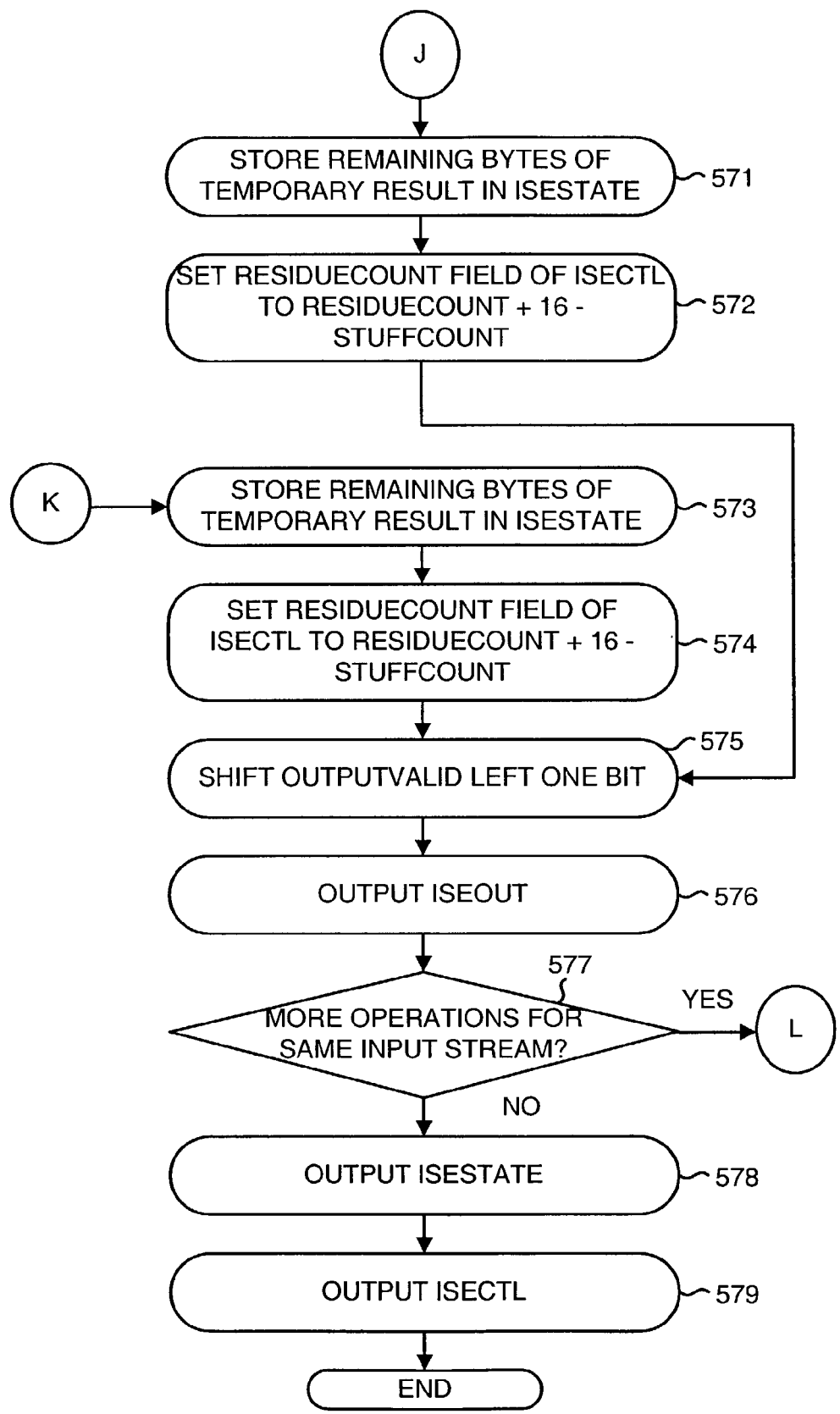

FIGS. 5G and 5H are flowcharts of exemplary processing for performing POS byte-unstuffing according to an implementation consistent with the principles of the invention. Processing may begin with the loading of values into ISEin 310, ISEstate 320, and ISEctl 330. For example, the saved ResidueCount value may be stored in a field within ISEctl 330 (act 561) (FIG. 5G). The saved EscapePending bit may also be stored in ISEctl 330 (act 562). A zero value may be stored in the OutputValid field in ISEctl 330 (act 563). The saved Residue value may be stored in ISEstate 320 (act 564). An input value may be stored in ISEin 310 (act 565).

The POS byte-unstuff operation may then be performed on the contents of ISEin 310, using the EscapePending bit from ISEctl 330 as an additional input (in case the previous input word ended with a 0x7d byte) (act 566). This replaces all 0x7d <X> byte pairs with a single byte equal to <X> XORed with the value 0x20. If the EscapePending bit is set, the first byte of the input word is treated as having a preceding 0x7d byte. The result of the POS byte-unstuff operation is an output value (POSstuffOut) of up to 16−8 bytes (where 8 is the most control escape bytes that the process can delete from a 16-byte input value. The POS byte-unstuff operation also produces a count of control escape bytes deleted (StuffCount). It also updates the EscapePending bit in ISEctl 330, which is set to "1" if the last input byte was a 0x7d value (which will also have been deleted in the POSstuffOut); otherwise, the EscapePending bit is set to "0."

The valid ResidueCount bytes of the Residue may be concatenated with the valid (16−StuffCount) bytes of POSstuffOut to get a temporary result of (ResidueCount+16−StuffCount) bytes (act 567). It may then be determined whether (ResidueCount+16−StuffCount) is less than 16 (act 568). If not, the first 16 bytes of the temporary result may be stored in ISEout 340 (act 569). Byte 0 of OutputValid may then be set to "1" (act 570). The remaining (ResidueCount−StuffCount) bytes of the temporary result (forming the new Residue value) may be stored in ISEstate 320 (act 571) (FIG. 5H). The ResidueCount field of ISEctl 330 may be loaded with (ResidueCount−StuffCount) (act 572).

If (ResidueCount+16−StuffCount) is less than 16 (act 527), then the remaining (ResidueCount+16−StuffCount) bytes of the temporary result (forming the new Residue value) may be stored in ISEstate 320 (act 573). The ResidueCount field of ISEctl 330 may then be loaded with (ResidueCount+16−StuffCount) (act 574). OutputValid may then be shifted left by one bit (act 575). The contents of ISEout 340 may be output on output port Sx (act 576).

It may then be determined whether more operations are to be performed on the same input stream (up to four inputs can be processed in sequence due to the size of the OutputValid field) (act 577). If so, processing may continue at act 565 with the loading of an input value into ISEin 310. Otherwise, the contents of ISEstate 320 may be saved, as well as the ResidueCount and EscapePending values from ISEctl 330 (acts 578 and 579). The OutputValid field may also be examined to determine which output cycles had valid data on output port Sx.

Several of the above-described acts may be performed in parallel or may be pipelined. For example, acts 561-564 may be performed in parallel; acts 566-576 may be performed in parallel, or may be pipelined internally as several acts; acts 578 and 579 can be performed in parallel. Further, act 565 and acts 566-576 may be pipelined, loading ISEin 310 with input word i+1 while processing input word i. Similarly, act 576 may be pipelined, outputting the results of input word i−1 while processing input word i.

Bit Movement

The bit-movement functions of ISE unit 260 are programmed using memories 370. The 16 64×128 memories 370 may be ganged to function as 256 64×8 memories. Each of these memories controls one of the 256 output bits in ISEout 340 and ISEoutX 350 by controlling a 256-to-1 multiplexer of crossbar 360 that selects from one of the 256 input bits held in ISEin 310 and ISEstate 320. The value sent to ISEoutX 350 may also be loaded into ISEstate 340 to allow for "chained" operations that require multiple cycles.

ISE unit 260 may be programmed to perform several types of functions (up to 64, in any combination), such as:
(1) any arithmetic or logical shift or rotate operation on up to 256 bits or any sub-field thereof;
(2) extract any field or fields from up to 256 input bits into any positions in up to 256 output bits (extract);
(3) insert any field (or fields) into 128 output bits (merge);
(4) set or clear any sub-field from 1 to 128 bits (requires a known constant with at least one 1 and one 0 in ISEstate);
(5) sign-extend any sub-field of up to 256 bits to any boundary desired in up to 256 output bits; and
(6) insert or delete bits or bytes from a data stream.

Figure 6A:
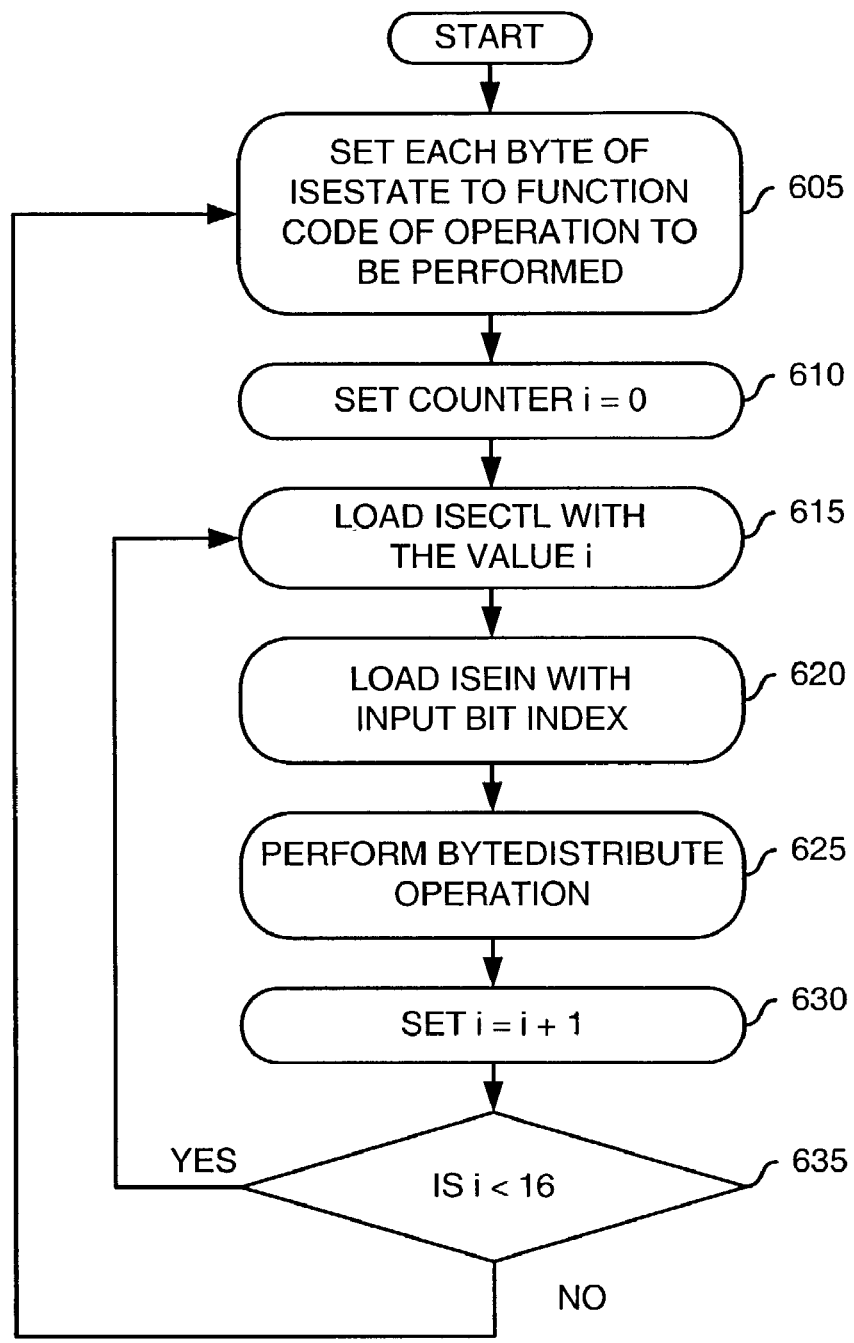
FIG. 6A is a flowchart of exemplary processing for programming bit-movement functions according to an implementation consistent with the principles of the invention.

FIG. 6A is a flowchart of exemplary processing for programming bit-movement functions according to an implementation consistent with the principles of the invention. This programming may be done when code is loaded into ISE unit 260, but typically not during normal operation. Processing may begin with each byte of ISEstate 320 being set to the function code f of the operation to be programmed (act 605). The function code f may contain a value in the range 0 . . . 63 that identifies the operation to be programmed. The function code f may be duplicated in each byte of ISEstate 320.

A counter, i, may then be initialized to zero (act 610). The value i may be loaded into each byte j (j=0 . . . 15) of ISEctl 330 (act 615). Each byte j (j=0 . . . 15) of ISEin 310 may be loaded with the input bit index (0-255) that is used to select one of the 256 bits from the concatenation of the two 128-bit input registers (ISEin 310, ISEstate 320) for output bit (16*j+i) (on ISEout 340 and ISEoutX 350) (act 620). The loading of ISEctl 330 and ISEin 310 may be performed concurrently within a single operation cycle of ISE unit 260. Also, the values loaded into ISEctl 330 and ISEin 310 may be pre-computed constants fetched from a table or may be generated by ALU 240.

Next, the ByteDistribute operation (Table 1) may be performed, where the 16 bytes of ISEin 310 (i.e., the multiplexer selector values) are written into lane i of memory address f of each of the 16 memories (j=0 . . . 15) (act 625). This operation may be pipelined with the loading of ISEctl 330 and ISEin 310. For example, while the values for i+1 are being loaded into ISEctl 330 and ISEin 310, the ByteDistribute operation may be performed for the value i.

The value i may then be incremented by one (act 630). If i is less than 16 (act 635), then processing may return to act 615. Otherwise, processing may return to act 605 for programming of the next operation. The 16-count loop may be part of a larger loop that loads the entire memory 265 from a table of 1024 pairs of values from ISEin 310 and ISEstate 320.

Figure 6B:
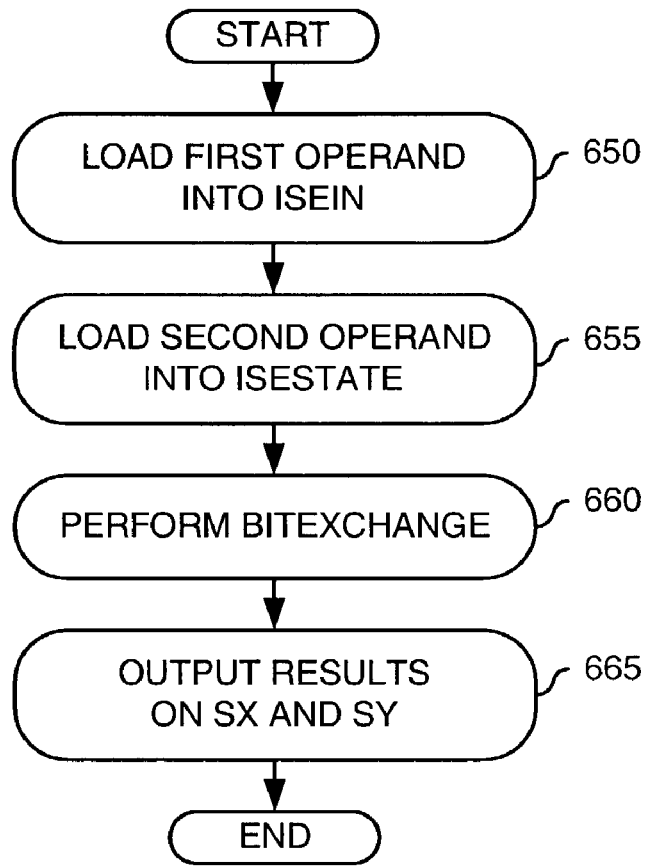
FIG. 6B is a flowchart of exemplary processing for performing bit-movement functions according to an implementation consistent with the principles of the invention.

FIG. 6B is a flowchart of exemplary processing for performing bit-movement functions according to an implementation consistent with the principles of the invention. Processing may begin with the loading of a first operand into ISEin 310 and a second operand into ISEstate 320 (acts 650 and 655). In one implementation, the operands include 128-bit operands. The loading operations may be performed concurrently during the same cycle. It may be possible to omit the loading of ISEstate 320 if the value from the prior cycle's output to ISEstate 320 is to be used (e.g., a chained operation) or if the bits to be used in the output come only from ISEin 310.

Next, the BitExchange operation (Table 1) may be performed (act 660). During this operation, the desired function code f (0 . . . 63) may be supplied on the ISEfunc inputs and the 256 bit result may be loaded into ISEout 340 and ISEoutX 350. For example, bits 127 . . . 0 of ISEin 310 may be supplied to bits 255 . . . 128 of crossbar 360 and bits 127 . . . 0 of ISEstate 320 may be supplied to bits 127 . . . 0 of crossbar 360. Output bits 255 . . . 128 of crossbar 360 may be supplied to bits 127 . . . 0 of ISEout 340 and output bits 127 . . . 0 of crossbar 360 may be supplied to bits 127 . . . 0 of ISEoutX 350. The value loaded into ISEoutX 350 may also be loaded into ISEstate 320. The 256 bit result from ISEout 340 and ISEoutX 350 may then be provided on output ports Sx and Sy, respectively (act 665).

These acts may be pipelined and represent successive cycles in ISE unit 260. Also, it may not be necessary to use all the memory locations in the BitExchange operation. For example, 16 locations may be used for the BitExchange and 48 locations may be used for other purposes, such as space-time switching operations.

In a simple example of a bit-movement function, assume that bits or bytes are to be inserted or deleted from a data stream. In implementing this operation, ISEstate 320 may function as a "partial result" register for a chaining operation.

Assume that the data being inserted or deleted is at the front of a chunk (e.g., at the front of a packet). For a deletion operation, ISE unit 260 may be programmed to take the first 128-bit word of the chunk in ISEstate 320, and the second word in ISEin 310, and output the first 128-bit result word in ISEout 340, while leaving whatever bits remain in ISEstate 320, aligned so that the "unused" bits of the result in ISEstate 320 are in the same position as the deleted bits from the first 128-bit input word (originally loaded into ISEstate 320). Repeating the operation while supplying succeeding 128-bit input words in ISEin 310 produces the desired result. Basically, this is a 256-bit shift operation on ISEstate||ISEin, with the 256-bit result (minus the deleted field size) going into ISEout||ISEstate. Thus, ISEstate 320 serves as a "multi-bit carry."

Insertion works similarly, except the data to be inserted may be put into ISEstate 320, right-justified, the first 128-bit word of the original chunk put into ISEin 310, and the shift operation shifts right instead of left. The feedback operation of ISEstate 320 allows data to be streamed through ISE unit 260 at a rate of 128 input and output bits every cycle.

Space/Time Byte Switching

This subset of ISE functions is intended primarily to support SONET channel multiplexing and demultiplexing. There may be other applications as well. There are two operations supported in this mode: ByteDistribute and ByteCollect. ByteDistribute may include a write operation that writes each input byte of ISEin 310 into one of 16 lanes in the corresponding memory 370. The lane selected and the memory address used is independent for each memory 370, and are controlled by the corresponding bytes of ISEctl 330 (lane selection) and ISEstate 320 (address selection).

ByteCollect may include a read operation that selects one of the 16 input-byte memories to source each byte in ISEout 340. The memory 370 selected for each byte is controlled by the corresponding byte of ISEctl 330, and the address used for each memory 370 may be controlled by the corresponding byte of ISEstate 320. The byte lane used from the input memory 370 is automatically the same as the output byte lane's number.

Essentially, this operation implements a multi-channel, time-distributed crossbar switching function between 16 input byte lanes and 16 output byte lanes. By applying the right sequence of address and byte-selection patterns for alternating ByteDistribute and ByteCollect operations, ISEout 340 can be controlled to have 16 sequential bytes from one SONET subchannel on each ByteCollect cycle (or the reverse, for SONET multiplexing).

Control of ISE unit 260 for SONET multiplexing/demultiplexing operations may require four internal memory references per 128 bits of input/output to supply the values to ISEctl 330 and ISEstate 320 for each of the write and read operations. These will typically be read from tables generated by control processor 120 (FIG. 1) and stored in SRAM 250 (FIG. 2) to correspond to the SONET subchannel structure. Thus, each of the four control values may need to be in its own memory bank within SRAM 250, since a total of 4 such reads may be required for each chunk input (and output), and each bank may only support 4-5 accesses per chunk-time.

The 16-byte values produced by the ISE operation will also typically need to be buffered in SRAM 250. Since producing a chunk requires a total of four 128-bit words, and these will not usually be emitted sequentially by the demultiplexing (or multiplexing) algorithm, they should be stored in the channel's context. This adds three memory writes and three memory reads, and requires at least two more banks of SRAM 250. Only three write/read pairs are needed, since the fourth 128-bit result will complete an outgoing chunk, and can be sent directly to the output registers (e.g., output register file 220) to join the other 128-bit words pulled from context memory as the time nears for the output chunk. ISE unit 260 may need four cycles per 128 bits passed through in this mode: one each for the read and write operations, and one each to set up the control values for read and for write.

These operations are driven by two tables of control values. One table controls the input side (via the ByteDistribute operation), and the other table controls the output side (via the ByteCollect operation). In typical operation, the input and output operations are interleaved in such a way that for each 16-byte input value, one, and only one, of the 16 input bytes is a final byte in a block of 16 bytes to be output.

The values stored in the two control tables may determine whether the overall operation being performed is a multiplexing or demultiplexing operation. In the case of SONET multiplexing and demultiplexing, the table values also reflect the aggregation structure of the SONET subchannels. For example, SONET OC-1 channels 1, 2, and 3 may be individual channels, or they may be a concatenated channel, such as an OC-3c, or they may be part of a larger aggregate, such as ¼ of an OC-12c, etc.

For SONET multiplexing and demultiplexing, each of the tables may include a number of entries equal to 90*9* (number of OC-1 subchannels)/(number of input bytes used per table entry). For example, in an implementation that processes OC-192 SONET channels and 16 input bytes, there may be 9720 entries in each of the two control tables, with each entry containing two 16-byte values, one for ISEctl 330, and one for ISEin 310.

In one implementation, the fetching of control word entries may be performed external to ISE unit 260, typically handled by storing the two tables (e.g., an input control table and an output control table) in different banks of SRAM 250. General register file 230 may store pointers (IPtr and OPtr) to each of the two tables and a loop counter. ALU 240 may increment the pointers and decrement the loop counter. When the loop counter reaches zero, the pointers may be reset to point to the start of the tables and the loop counter may be set to the maximum value, while processing input taken from input register file 210 and outputting results to output register file 220.

Alternatively, the 16-byte output words from ISE unit 260 may be buffered in additional SRAM banks 265, before being passed to output register file 220. This may be useful if ISE memory 265 is shared between time-space switching and other functions, such as bit-exchange operations, leaving less than 64 bytes for each of the 192 channels for use by the time-space switching operation.

Figure 7A:
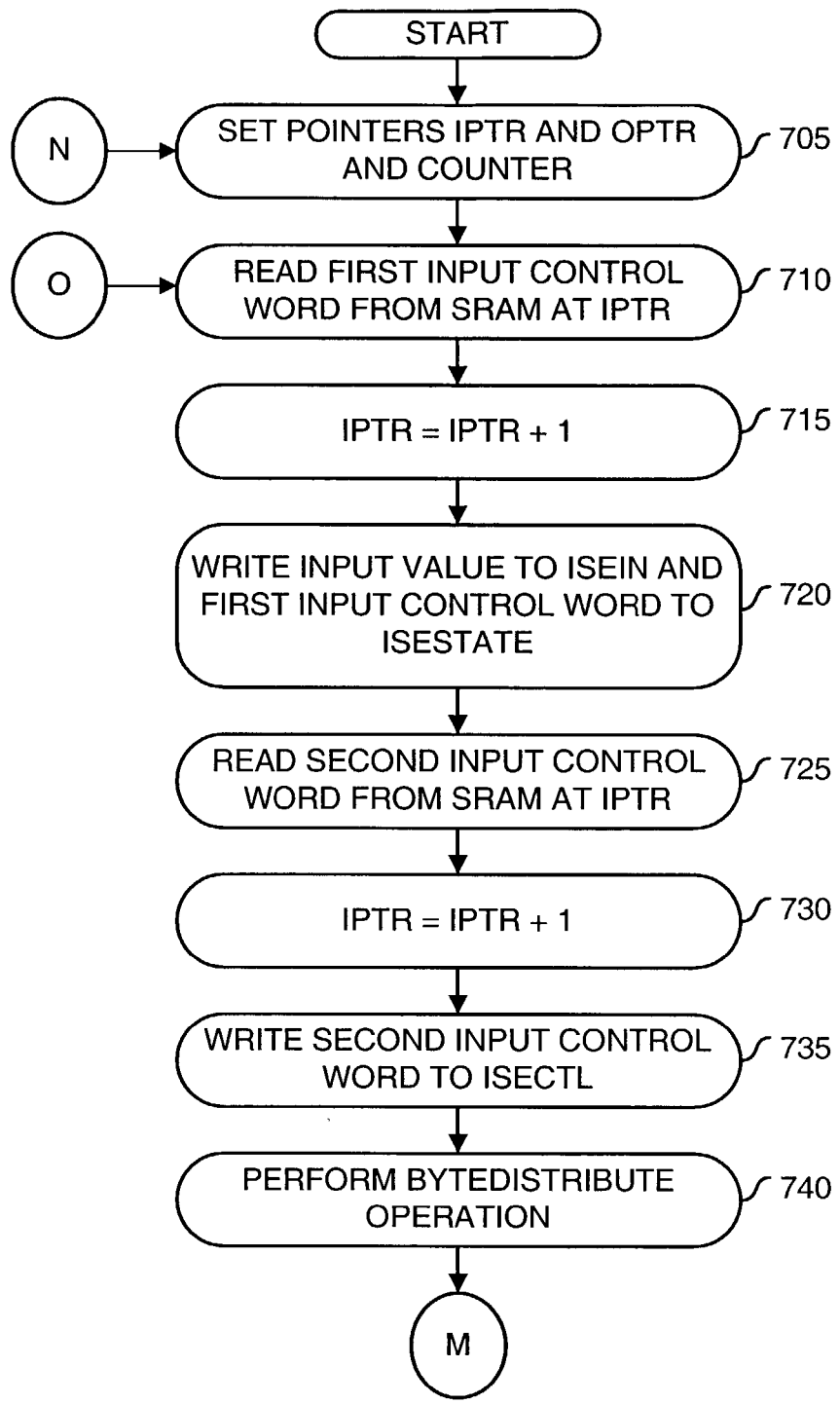
FIGS. 7A and 7B are flowcharts of exemplary processing for performing space/time byte switching functions according to an implementation consistent with the principles of the invention.
Figure 7B:
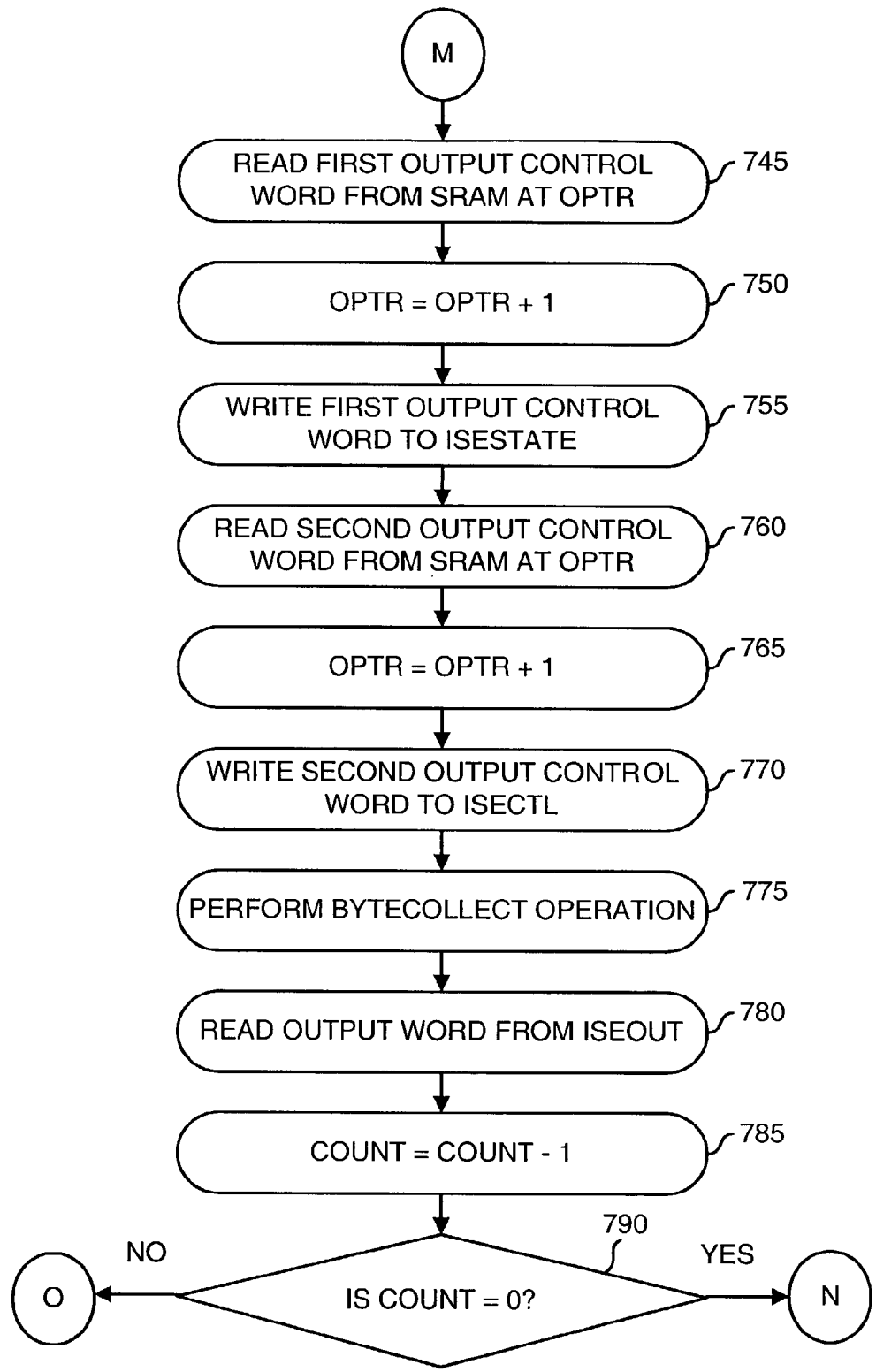

FIGS. 7A and 7B are flowcharts of exemplary processing for performing space/time byte switching according to an implementation consistent with the principles of the invention. Processing may begin with the setting of pointers IPtr and OPtr and a loop counter value (COUNT) (act 705) (FIG. 7A). Pointer IPtr may be set to the start of the input control table and pointer OPtr may be set to the start of the output control table. The loop counter may be set to a maximum value, such as 9720.

The first input control word (e.g., a 16-byte input control word) may then be read from SRAM 250 at the location of pointer IPtr (act 710). Pointer IPtr may then be incremented by one (act 715). A 16-byte input value may be written to ISEin 310 and the first input control word may be written to ISEstate 320 (act 720). The second input control word may be read from SRAM 250 at the location of pointer IPtr (act 725). Pointer IPtr may then be incremented by one (act 730). The second input control word may be written to ISEctl 330 (act 735). A ByteDistribute operation may then be performed, using the first and second input control words, as described above (act 740).

Next, the first output control word (e.g., a 16-byte output control word) may be read from SRAM 250 at the location of pointer OPtr (act 745) (FIG. 7B). Pointer OPtr may then be incremented by one (act 750). The first output control word may be written to ISEstate 320 (act 755).

The second output control word may be read from SRAM 250 at the location of pointer OPtr (act 760). The pointer OPtr may then be incremented by one (act 765). The second output control word may be written to ISEctl 330 (act 770). A ByteCollect operation may then be performed, using the first and second output control words, as described above (act 775).

A 16-byte output word may then be read from ISEout 350 (act 780). The value of the loop counter may then be decremented by one (act 785). If the resulting value of the loop counter is zero (act 790), then processing may continue at act 705. Otherwise, processing may continue at act 710.

Some of the above-identified acts may be performed external to ISE unit 260. Also, acts 710-790 may be pipelined, such that a total of four ISE cycles are used for each 16-byte input and output. This pipelining may be summarized as: (1) load input data word i, load input control word i.1, and perform ByteCollect; (2) load input control word i.2, and unload output data i−1; (3) perform ByteDistribute, and load output control word i.1; and (4) load output control word i.2.

The operations external to ISE unit 260 can be similarly pipelined, with SRAM 250 performing and completing a read on each of 4 cycles. The pointer increment and the counter decrement operations can similarly be reduced to 4 cycles or less, by interleaving the input and output control words in a single table, and employing a 4-word-burst read operation in SRAM 250, allowing the pointer to be incremented by 4, instead of incrementing it 4 times by +1, leaving only 2 ALU operations per loop iteration.

A separate process may be used to compute the tables: one version for multiplexing and one for demultiplexing. The process may use the SONET channel structure as input (i.e., which channels are concatenated together, and which are independent). Essentially, each of the 16 input bytes on a particular iteration of the demultiplexing operation is put into a byte lane corresponding to its phase, with a total of 16 phases possible. Each input byte lane belongs to a different phase, and the channel corresponding to the lane that has phase 16 on this cycle will output its collected 16 bytes in the output part of the loop on the current iteration. This gets a bit more complicated when aggregated channels are taken into account, but numerous channel patterns can be computed relatively easily which will produce viable control word tables.

Byte-Wise Table Lookup

In this mode, ISE unit 260 allows the internal memories 370 to be used for a parallel byte-mapping operation that includes a byte-wise remapping of 128 input bits into 128 output bits. A 256×8 table may be used to map each of the 16 input bytes into the corresponding output bytes. The table used for each of the 16 input bytes may be different. Up to four different table sets can be supported.

This operation may be useful for translating complex values in headers, such as the IP TOS/DS byte, into a smaller set of values used to index internal tables. It may also be useful for mapping byte values to one of 16 (or fewer) values subsequently used for 16-way branching via the ALUout<3 . . . 0> flags, or to otherwise recognize "magic numbers" in headers.

In this mode, the 16 64×128 memories 370 operate as 16 4×256×8 memories. Each of the mapping tables uses a block of 16 memory addresses (out of 64 total). The 16 addresses may be aligned on even address multiples of 16. Addresses not used for the table may be used for any other purpose. The table may be loaded by initialization code when ISE unit 260 is initialized. Alternatively, the table may be loaded at any other time, though addresses in the table cannot be safely used during the period when the table is loaded.

Figure 8A:
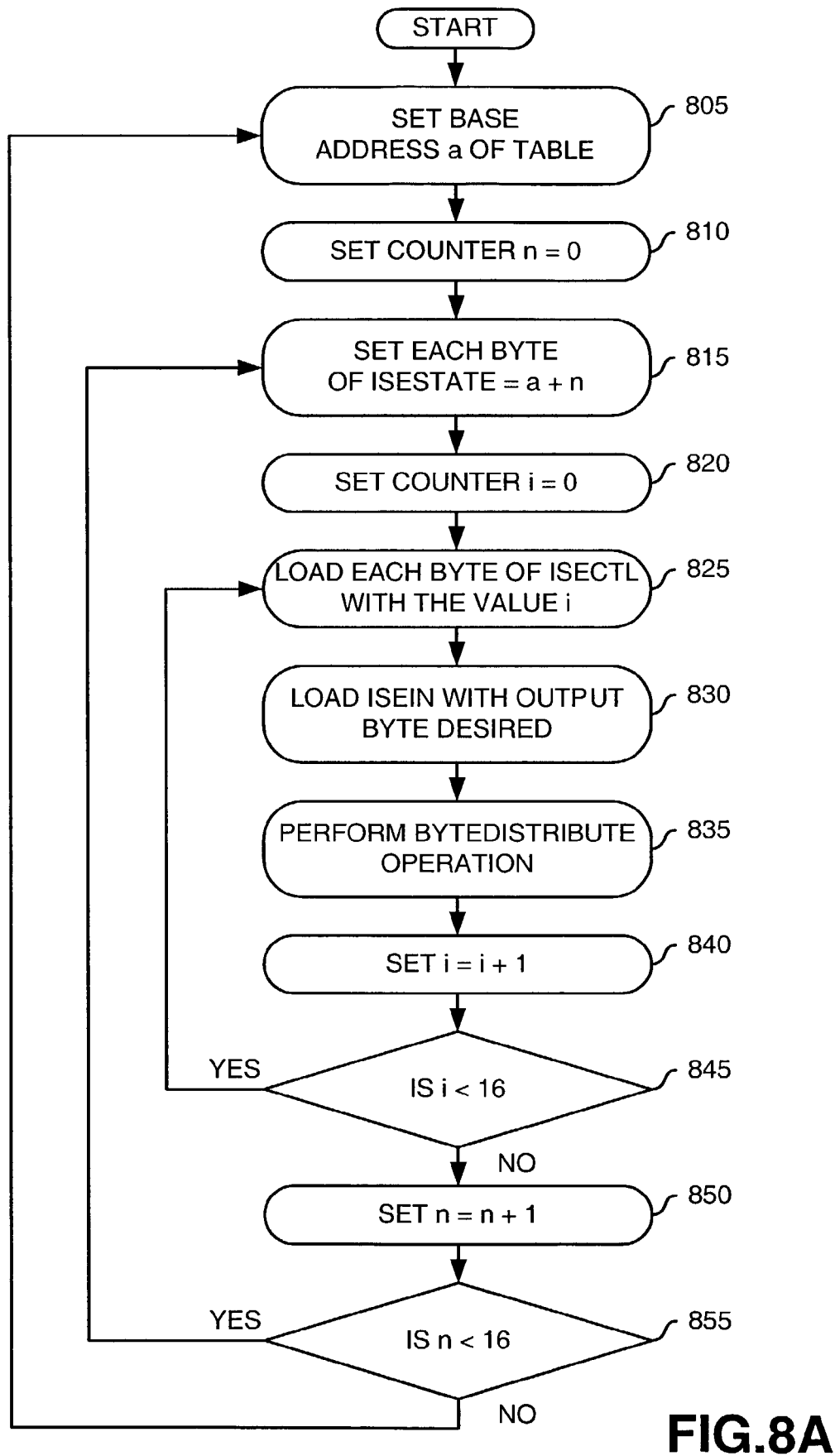
FIG. 8A is a flowchart of exemplary processing for programming byte-wise table lookup functions according to an implementation consistent with the principles of the invention.

FIG. 8A is a flowchart of exemplary processing for programming byte-wise table lookup functions according to an implementation consistent with the principles of the invention. This programming may be done for each mapping table to be programmed. In one implementation, up to four mapping tables may be defined.

Processing may begin with setting of the base address "a" of the table (act 805). In one implementation, the base address may be set to 0, 16, 32, or 48 (i.e., multiples of 16). A counter, n, may then be initialized to zero (act 810). Each byte of ISEstate 320 may be set to a+n (act 815). This results in a value in the range of 0 . . . 63, which is duplicated in each byte of ISEstate 320.

A counter, i, may then be initialized to zero (act 820). The value i may then be loaded into each byte j (j=0 . . . 15) of ISEctl 330 (act 825). Each byte j (j=0 . . . 15) of ISEin 310 may be loaded with the output byte desired for the input byte value (16*n+i) if found in the input byte position j (act 830). The loading of ISEctl 330 and ISEin 310 may be performed concurrently within a single operation cycle of ISE unit 260. Also, the values loaded into ISEctl 330 and ISEin 310 may be pre-computed constants fetched from a table or may be generated by ALU 240.

Next, the ByteDistribute operation (Table 1) may be performed, where the 16 bytes of ISEin 310 (i.e., the output values for each of the 16 input lanes for input value 16*n+i) are written into lane i of memory address a+n of each of the 16 memories (j=0 . . . 15) (act 835). This operation may be pipelined with the loading of ISEctl 330 and ISEin 310. For example, while the values for i+1 are being loaded into ISEctl 330 and ISEin 310, the ByteDistribute operation may be performed for the value i.

The value i may then be incremented by one (act 840). If i is less than 16 (act 845), then processing may return to act 825. Otherwise, the value n may be incremented by one (act 850). If n is less than 16 (act 855), then processing may return to act 815. Otherwise, processing may return to act 805 for programming of the next table.

Figure 8B:
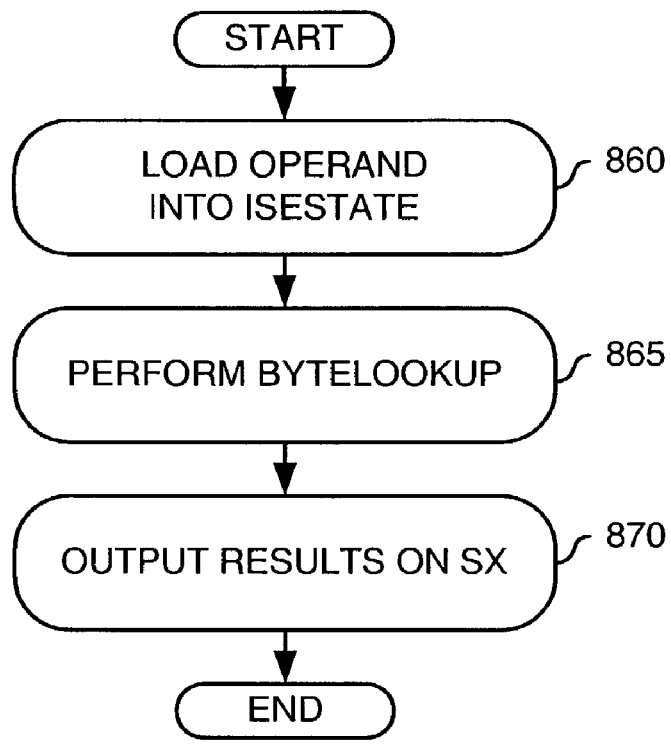
FIG. 8B is a flowchart of exemplary processing for performing byte-wise table lookup functions according to an implementation consistent with the principles of the invention.

FIG. 8B is a flowchart of exemplary processing for performing byte-wise table lookup functions according to an implementation consistent with the principles of the invention. Processing may begin with the loading of an operand into ISEstate 320 (act 860). In one implementation, the operand includes a 128-bit operand.

Next, the ByteLookup operation (Table 1) may be performed (act 865). During this operation, the desired table number (0 . . . 3) may be supplied on the ISEfunc<5 . . . 4> inputs and the result may be loaded into ISEout 340. Each of the input bytes may be replaced in the output value by the 8-bit memory value it indexes in memory 370 for its byte lane. The 16 byte result from ISEout 340 may then be provided on output port Sx (act 870).

In other words, this operation is implemented by having each byte of ISEstate 320 address a single 8-bit result from one of memories 370. This uses the high 2 bits of ISEfunc concatenated with the low 4 bits of each input byte as the memory address, and the high 4 bits of each ISEstate 320 byte to select one 8-bit lane from the 128-bit result. Thus, ISEfunc selects one of four (or fewer) tables. This allows memories 370 to be shared between bit exchange, space/time byte-switching, and byte lookup operations.

These acts may be pipelined and represent successive cycles in ISE unit 260. Also, it may not be necessary to use all the memory locations in the ByteLookup operation. For example, 16 locations may be used for a single ByteLookup table and 48 locations may be used for other purposes, such as space-time switching operations.

Cryptography

ISE unit 260 supports four cryptography primitives: AESRound and AESFinal for encryption, and AESInverseRound and AESInverseFinal for decryption. AESRound and AESInverseRound perform a single round calculation for the new NIST Advanced Encryption Standard. The round key is stored in ISEin 310 at the start of the operation. ISEstate 320 contains the round state and is normally loaded with the data to encrypt/decrypt at the start of a 10-round sequence. The output of the round is left in ISEstate 320. AESFinal and AESInverseFinal perform the last round of an AES encryption/decryption operation. The inputs and outputs are the same as for AESRound and AESInverseRound, but the internal logic functions slightly differently.

The AES operations assume that the memories are preloaded with tables derived from the AES cipher algorithm (these are sometimes referred to as "T" tables). The loading of the tables is basically the same as the procedure for loading the tables for a table-lookup operation (as described previously), except that each AES table is 32 bits wide, not 8, and, thus, includes four table blocks in the memory. Different versions of the tables may be used for encryption and decryption, and the logic may also differ.

The cipher key may be expanded into a set of round keys for both encryption and decryption. The operations of ISE unit 260 (described below) assumes that the round keys are available in the registers or memory external to ISE unit 260 and are provided to ISE unit 260 in the correct order. Generally, the round keys may be computed once when the cipher key is first supplied, and the resulting round key array may be stored in SRAM 250. If only one round key is in use at a time, however, the round keys might be stored in the general register file 230. The initial computation of the round keys may differ for encryption and decryption.

Generally, ISE unit 260 may support 128-bit blocksize AES with 128-bit keys. The sequence of operations (assuming AES is used in ECB mode) may include loading ISEstate 320 with the data to encrypt/decrypt, ISEin 310 with the first round key, and then performing nine AESRound/AESInverseRound operations. The sequence further includes loading the next round key into ISEin 310 for the following round, performing a single AESFinal/AESInverseFinal operation, and then taking the result out of ISEstate 320. Using ISE unit 260 to perform AES operations may use the entire memories 370 to store the necessary S-box tables. The cryptography primitive may also be useful as a hashing operation on 128-bit inputs.

Figure 9:
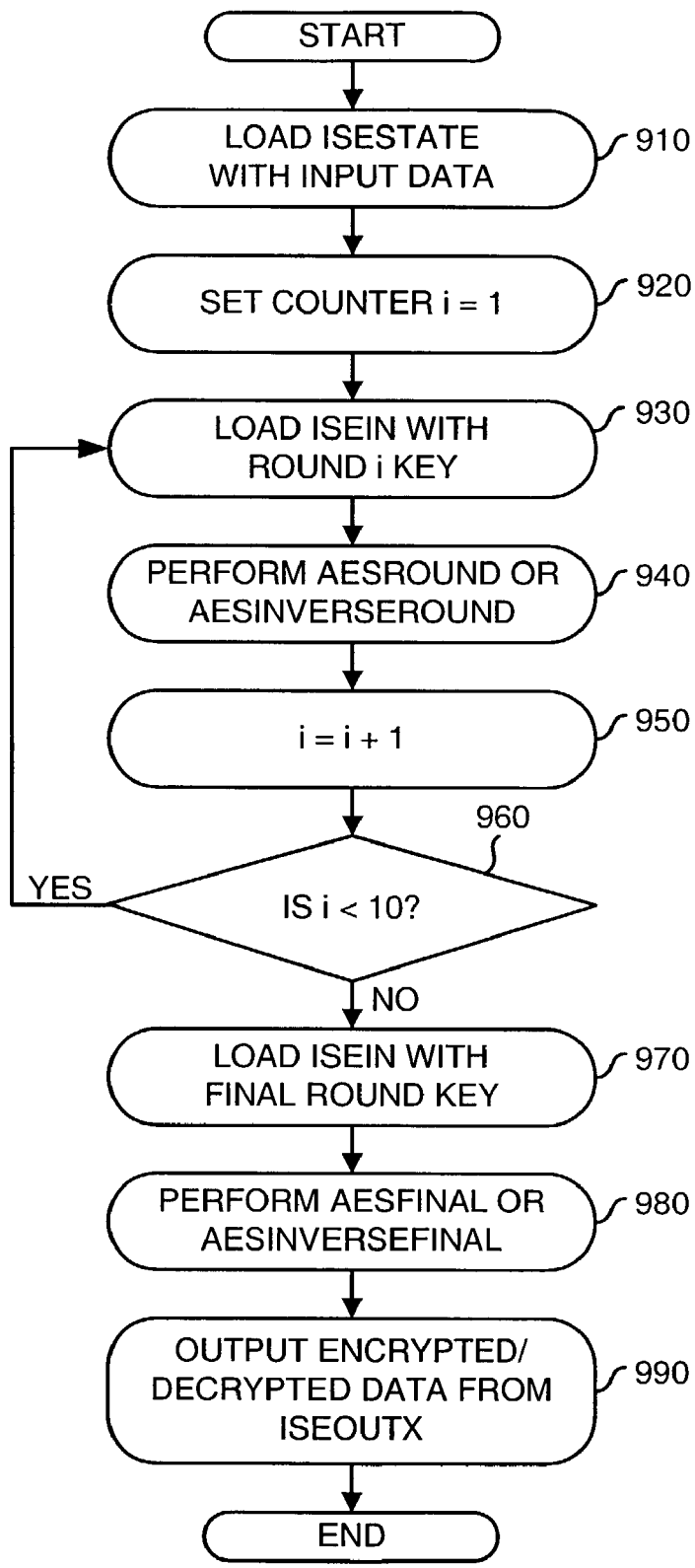
FIG. 9 is a flowchart of exemplary processing for performing cryptography functions according to an implementation consistent with the principles of the invention.

FIG. 9 is a flowchart of exemplary processing for performing cryptographic functions according to an implementation consistent with the principles of the invention. Processing may begin with the loading of input data (an initialization vector in the case of CBC mode) in ISEstate 320. A counter i may then be set to one (act 920). ISEin 310 may then be loaded with the round i key (act 930).

AESRound, in the case of encryption, or AESInverseRound, in the case of decryption, may then be performed (act 940). The AESRound/AESInverseRound operation is very similar to the byte-wise table lookup operations. For example, each byte of ISEstate 320 addresses a single 32-bit result word from one of memories 370 (using the low 6 bits of the byte as the memory address, and the high 2 to select one 32-bit lane from the 128-bit result). The 32-bit outputs from each memory 370, and the round key, are combined using a simple set of byte-wise XOR operations (as described in the AES implementation description, available from the NIST web site), and the result latched into ISEstate 320 for the next round.

The value i may then be incremented by one (act 950). A determination may then be made whether the value of i is less than ten (act 960). If so, processing may continue at act 930 with the loading of the next round key into ISEin 310. Otherwise, ISEin 310 may be loaded with the final round key (act 970). AESFinal, in the case of encryption, or AESInverseFinal, in the case of decryption, may then be performed (act 980). The AESFinal/AESInverseFinal operation selects a slightly different set of output bytes for the XOR operations, but is otherwise identical to the AESRound/AESInverseRound operation. The encrypted/decrypted data may be stored in ISEoutX and, then, output from output port Sy (act 990).

In an alternative implementation, acts 930 and 940 may be repeated a predetermined number of times (e.g., nine times) and acts 920, 950, and 960 may be eliminated.

CONCLUSION

Systems and methods consistent with the present invention provide an execution unit within a network device. The execution unit may be programmed to perform a wide variety of protocol-processing primitive operations, such as bit-field inserts and extracts, shift operations, bit and byte stuffing and unstuffing, SONET channel decomposition (e.g., time-space interleaving), byte-remapping (e.g., table lookup), and cryptography operations. The execution unit, as described herein, may perform protocol processing at speeds of 10 Gb/s and higher.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, certain portions of the invention have been described as "logic" that performs one or more functions. This logic may include hardware, such as an application specific integrated circuit, software, or a combination of hardware and software.

Also, while series of acts have been presented with regard to the flowcharts of FIGS. 5A-9, the order of the acts may differ in other implementations consistent with the principles of the invention. In addition, certain acts may be performed concurrently.

No element, act, or instruction used in the description of the present application should be construed as critical or essential to the invention unless explicitly described as such. Also, as used herein, the article "a" is intended to include one or more items. Where only one item is intended, the term "one" or similar language is used. The scope of the invention is defined by the claims and their equivalents.

What is claimed is:

1. A network device, comprising:
   a switching fabric; and
   a plurality of network processors connected to communicate via the switching fabric, the network processors including:
   a plurality of input register files,
   a plurality of output register files, and
   an execution unit configured to perform a plurality of protocol-processing functions on data received via the input register files and output the data via the output register files, the execution unit comprising:
   a plurality of specialized registers configured to store the data during performance of the protocol-processing functions, and
   a memory that performs a plurality of functions depending on which of the protocol-processing functions is performed by the execution unit.

2. The network device of claim 1, wherein the memory includes:
   a plurality of fast memories.

3. The network device of claim 2, wherein the fast memories operate together to form at least one of:
   a set of high-bandwidth scratchpad memories,
   a set of control memories, and
   a set of byte-indexed table memories.

4. The network device of claim 1, wherein the protocol-processing functions include at least two of stuffing and unstuffing, bit movement, space/time byte switching, table lookup, and cryptography primitive operations.

5. The network device of claim 4, wherein the stuffing and unstuffing operations include High-Level Data Link Control (HDLC) bit-stuffing, HDLC bit-unstuffing, Packet-Over-SONET (POS) byte-stuffing, and POS byte-unstuffing.

6. The network device of claim 4, wherein the bit movement operations include any combination of arithmetic or logical shift or rotate operations, extraction or insertion of one or more fields of the data, clearing of one or more sub-fields of the data, sign-extension of one or more of the sub-fields of the data, and insertion or deletion of one or more bits or bytes of the data.

7. The network device of claim 4, wherein the space/time byte switching operations include SONET channel multiplexing and demultiplexing.

8. The network device of claim 4, wherein the table lookup operations include parallel byte-mapping operations.

9. The network device of claim 4, wherein the cryptography primitive operations include round calculations for an Advanced Encryption Standard encryption or decryption.

10. The network device of claim 1, wherein the specialized registers include:
one or more input registers,
at least one control register, and
one or more output registers.

11. The network device of claim 10, further comprising:
a crossbar connecting the one or more input registers to the one or more output registers.

12. The network device of claim 10, further comprising:
a plurality of multiplexers connected to provide data to the one or more input registers and the one or more output registers.

13. An execution unit within a network processor that performs a plurality of protocol-processing functions, comprising:
a plurality of specialized registers configured to store data during performance of the protocol-processing functions, the specialized registers including:
one or more input registers,
at least one control register, and
one or more output registers: and
a memory system that includes a plurality of memories configured to operate together to facilitate performance of the protocol-processing functions by the execution unit,
wherein the protocol-processing functions include at least two of stuffing and unstuffing, bit movement, space/time byte switching, table lookup, or cryptography primitive operations.

14. The execution unit of claim 13, wherein the memories operate together to form at least one of:
a set of high-bandwidth scratchpad memories,
a set of control memories, or
a set of byte-indexed table memories.

15. The execution unit of claim 13, wherein the stuffing and unstuffing operations include High-Level Data Link Control (HDLC) bit-stuffing, HDLC bit-unstuffing, Packet-Over-SONET (POS) byte-stuffing, and POS byte-unstuffing.

16. The execution unit of claim 13, wherein the bit movement operations include any combination of arithmetic or logical shift or rotate operations, extraction or insertion of one or more fields of the data, clearing of one or more sub-fields of the data, sign-extension of one or more of the sub-fields of the data, and insertion or deletion of one or more bits or bytes of the data.

17. The execution unit of claim 13, wherein the space/time byte switching operations include SONET channel multiplexing and demultiplexing.

18. The execution unit of claim 13, wherein the table lookup operations include parallel byte-mapping operations.

19. The execution unit of claim 13, wherein the cryptography primitive operations include round calculations for an Advanced Encryption Standard encryption or decryption.

20. An execution unit within a network processor that performs a plurality of protocol-processing functions, comprising:
a plurality of specialized registers configured to store data during performance of the protocol-processing functions, the specialized registers including:
one or more input registers,
at least one control register, and
one or more output registers;
a memory system that includes a plurality or memories configured to operate together to facilitate performance of the protocol-processing functions by the execution unit: and
a crossbar connecting the one or more input registers to the one or more output registers.

21. An execution unit within a network processor that performs a plurality of protocol-processing functions, comprising:
a plurality of specialized registers configured to store data during performance of the protocol-processing functions, the specialized registers including:
one or more input registers,
at least one control register, and
one or more output registers;
a memory system that includes a plurality of memories configured to operate together to facilitate performance of the protocol-processing functions by the execution unit: and
a plurality of multiplexers connected to provide data to the one or more input registers and the one or more output registers.

22. The execution unit of claim 20, wherein the memories include 16 64×128 memories.

23. A method for performing bit movement functions by an execution unit within a network processor, the execution unit including a plurality of specialized registers and a crossbar element, the method comprising:
loading a first operand into a first one of the registers;
loading a second operand into a second one of the registers;
providing the first and second operands to the crossbar element;
writing an output of the crossbar element to third and fourth ones of the registers;
storing contents of the fourth one of the registers to the second one of the registers; and
outputting contents of the third and fourth ones of the registers.

24. The method of claim 23, wherein the settings of the crossbar element are controlled by a control memory.

25. A method for performing a table lookup function by an execution unit within a network processor, the execution unit including a plurality of specialized registers and a memory system that includes a plurality of memories, the method comprising:

loading an operand into a first one of the registers;
receiving an address of a table stored in one or more of the memories;
using the operand to access a value in the table;
writing the value from the table into a second one of the registers; and
outputting contents of the second one of the registers.

26. A method for performing time-space switching by an execution unit within a network processor, the execution unit including a plurality of specialized registers and a memory system that includes a plurality of memories, the method comprising:

(a) writing input data into a first one of the registers;
(b) storing a first input control word in a second one of the registers;
(c) storing a second input control word in a third one of the registers;
(d) writing the input data into the memories based on the first and second input control words;
(e) storing a first output control word in the second one of the registers;
(f) storing a second output control word in the third one of the registers; and
(g) outputting the input data from the memories based on the first and second output control words.

27. The method of claim 26, wherein acts (b) through (g) are performed in a pipelined fashion.

28. The method of claim 26, wherein the writing the input data to the memories includes:

storing bytes of the input data in different ones of the memories based on the first and second input control words.

29. The method of claim 28, wherein the outputting the input data from the memories includes:

reading the bytes of the input data from the different ones of the memories based on the first and second output control words.

* * * * *

(12) EX PARTE REEXAMINATION CERTIFICATE (9408th)
United States Patent
Milliken et al.

(10) Number: US 7,289,524 C1
(45) Certificate Issued: Nov. 15, 2012

(54) EXECUTION UNIT FOR A NETWORK PROCESSOR

(75) Inventors: Walter Clark Milliken, Dover, NH (US); Jack Dietz, Cambridge, MA (US)

(73) Assignee: BBN Technologies Corp., Cambridge, MA (US)

Reexamination Request:
No. 90/011,956, Oct. 13, 2011

Reexamination Certificate for:
Patent No.: 7,289,524
Issued: Oct. 30, 2007
Appl. No.: 10/263,641
Filed: Oct. 3, 2002

Related U.S. Application Data

(60) Provisional application No. 60/327,094, filed on Oct. 4, 2001.

(51) Int. Cl.
*H04L 12/02* (2006.01)

(52) U.S. Cl. .......................... 370/419; 370/412; 370/413

(58) Field of Classification Search ........................ None
See application file for complete search history.

(56) References Cited

To view the complete listing of prior art documents cited during the proceeding for Reexamination Control Number 90/011,956, please refer to the USPTO's public Patent Application Information Retrieval (PAIR) system under the Display References tab.

*Primary Examiner* — Fred Ferris

(57) ABSTRACT

An execution unit (260) within a network processor (110) performs multiple protocol-processing functions. The execution unit (260) includes a set of specialized registers (310-350) and a memory system (265). The specialized registers (310-350) store data during performance of the protocol-processing functions. The specialized registers (310-350) include one or more input registers, at least one control register, and one or more output registers. The memory system (265) includes multiple memories that operate together to facilitate performance of the protocol-processing functions by the execution unit (260).

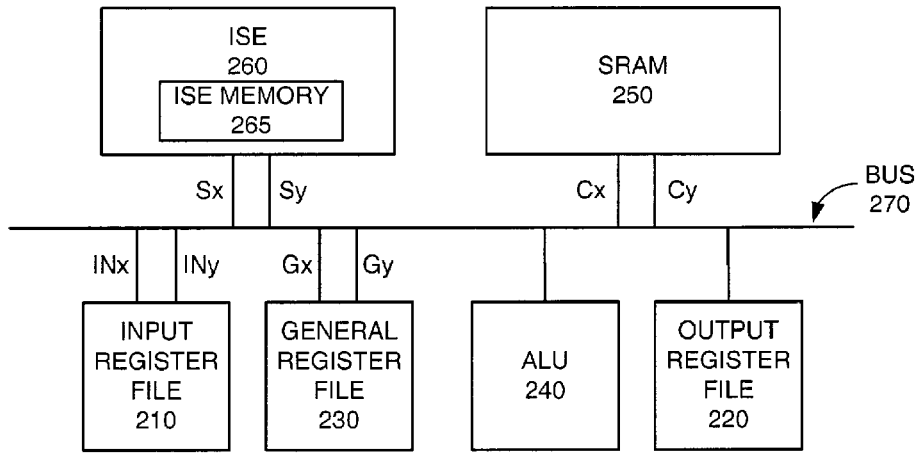

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

Claims 1-4, 6, 10, 13, 14 and 16 are cancelled.

Claims 5, 7-9, 11-12, 15 and 17-29 were not reexamined.

\* \* \* \* \*